(12) United States Patent
Huh et al.

(10) Patent No.: US 12,510,736 B2
(45) Date of Patent: Dec. 30, 2025

(54) IMAGING LENS SYSTEM

(71) Applicant: SAMSUNG ELECTRO-MECHANICS CO., LTD., Suwon-si (KR)

(72) Inventors: Jae Hyuk Huh, Suwon-si (KR); You Jin Jeong, Suwon-si (KR); Joon Hee Byun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 599 days.

(21) Appl. No.: 17/577,633

(22) Filed: Jan. 18, 2022

(65) Prior Publication Data

US 2023/0122006 A1    Apr. 20, 2023

(30) Foreign Application Priority Data

Oct. 6, 2021    (KR) .................. 10-2021-0132143

(51) Int. Cl.
| | |
|---|---|
| *G02B 13/00* | (2006.01) |
| *G02B 9/64* | (2006.01) |
| *G02B 15/14* | (2006.01) |

(52) U.S. Cl.
CPC ........... *G02B 13/0045* (2013.01); *G02B 9/64* (2013.01); *G02B 15/145113* (2019.08)

(58) Field of Classification Search
CPC ...... G02B 13/18; G02B 13/0045; G02B 9/64; G02B 3/0087; G02B 2003/0093
See application file for complete search history.

(56) References Cited

U.S. PATENT DOCUMENTS

| | | |
|---|---|---|
| 2018/0180856 A1 | 6/2018 | Jung et al. |
| 2019/0056568 A1* | 2/2019 | Huang ..................... G02B 3/02 |
| 2019/0391365 A1 | 12/2019 | Son et al. |
| 2020/0132969 A1* | 4/2020 | Huang ............. H01L 27/14627 |
| 2020/0209554 A1 | 7/2020 | Ko et al. |
| 2021/0063697 A1 | 3/2021 | Li et al. |

(Continued)

FOREIGN PATENT DOCUMENTS

| | | | |
|---|---|---|---|
| CN | 112711124 A | * | 4/2021 |
| KR | 10-2018-0076742 A | | 7/2018 |
| WO | WO-2022052018 A1 | * | 3/2022 ......... G02B 13/0045 |

OTHER PUBLICATIONS

Herbert Gross (ed.), Handbook of Optical Systems vol. 3., 377-379 (2007). (Year: 2007).*

(Continued)

*Primary Examiner* — Jennifer D. Carruth
(74) *Attorney, Agent, or Firm* — NSIP Law

(57) ABSTRACT

An imaging lens system is provided. The imaging lens system includes a first lens having refractive power, a second lens having refractive power, a third lens having refractive power, a fourth lens having refractive power and a concave image side surface, a fifth lens having refractive power and a concave object side surface, a sixth lens having refractive power, a seventh lens having refractive power, and an eighth lens having refractive power. The first to eighth lenses of the imaging system are sequentially arranged from an object side to an imaging side, and, in the imaging lens system, TTL/2 ImgHT<0.6, where TTL is a distance from an object side surface of the first lens to an imaging plane, and 2 ImgHT is a diagonal length of the imaging plane.

15 Claims, 12 Drawing Sheets

(56) References Cited

U.S. PATENT DOCUMENTS

| | | | | |
|---|---|---|---|---|
| 2021/0132336 | A1* | 5/2021 | Chen | G02B 9/64 |
| 2021/0149158 | A1 | 5/2021 | Hsueh et al. | |
| 2021/0157097 | A1* | 5/2021 | Hirano | H04N 23/55 |
| 2021/0157104 | A1 | 5/2021 | Jung et al. | |
| 2021/0173185 | A1 | 6/2021 | Li et al. | |
| 2021/0181476 | A1 | 6/2021 | Sun | |
| 2021/0191081 | A1 | 6/2021 | Dong et al. | |
| 2021/0271053 | A1* | 9/2021 | Hu | G02B 9/64 |
| 2021/0364756 | A1* | 11/2021 | Zhang | G02B 13/18 |
| 2021/0373301 | A1* | 12/2021 | Chen | G02B 13/0045 |
| 2022/0099934 | A1* | 3/2022 | Meng | G02B 13/0045 |
| 2022/0113508 | A1* | 4/2022 | Shi | G02B 13/0045 |
| 2022/0113509 | A1* | 4/2022 | Li | G02B 9/64 |
| 2022/0113510 | A1* | 4/2022 | Wang | G02B 13/0045 |
| 2022/0113514 | A1* | 4/2022 | Shi | G02B 13/04 |
| 2022/0121009 | A1* | 4/2022 | Sun | G02B 13/0045 |
| 2022/0137351 | A1* | 5/2022 | Chen | G02B 9/64 359/708 |
| 2022/0137358 | A1* | 5/2022 | Wang | G02B 13/0045 359/708 |
| 2022/0179173 | A1* | 6/2022 | Hu | G02B 3/04 |
| 2022/0229275 | A1* | 7/2022 | Wenren | G02B 13/0045 |

OTHER PUBLICATIONS

Simon Thibault et al., Consumer Electronic Optics: How Small a Lens Can Be? The case of Panomorph Lenses, 9192 Proceedings of SPIE 91920H-1 to 91920H-7 (2014). (Year: 2014).*

Chris George, World's Smallest Camera is the Size of a Grain of Sand, 2020, pp. 1-12 [online], [retrieved Jul. 9, 2024], retrieved from the Internet <URL: https://www.digitalcameraworld.com/news/worlds-smallest-camera-is-the-size-of-a-grain-of-sand>. (Year: 2020).*

Dan Carr, How to Calculate Field of View in Photography, 2016, pp. 1-41 [online], [retrieved May 31, 2024], retrieved from the Internet <URL: https://shuttermuse.com/calculate-field-of-view-camera-lens/>. (Year: 2016).*

Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*

Taiwanese Office Action Issued on May 19, 2022, in counterpart Taiwanese Patent Application No. 111102236 (3 pages in English and 4 pages in Mandarin).

Taiwanese Office Action issued on Jan. 18, 2024, in counterpart Taiwanese Patent Application No. 112102594 (4 pages in English, 5 pages in Chinese).

Korean Office Action issued on Mar. 13, 2024, in counterpart Korean Patent Application No. 10-2021-0132143 (7 pages in English, 6 pages in Korean).

Korean Office Action issued on Mar. 31, 2025, in corresponding Korean Patent Application No. 10-2021-0132143 (7 pages in English and 6 pages in Korean).

Korean Office Action issued on Mar. 31, 2024 in corresponding Korean Patent Application No. 10-2021-0132143 (7 pages in English and 6 pages in Korean).

* cited by examiner

IMAGING LENS SYSTEM

CROSS-REFERENCE TO RELATED APPLICATIONS

This application claims the benefit under 35 USC § 119(a) of Korean Patent Application No. 10-2021-0132143 filed on Oct. 6, 2021 in the Korean Intellectual Property Office, the entire disclosure of which is incorporated by reference for all purposes.

BACKGROUND

1. Field

The following description relates to an imaging lens system.

2. Description of Related Art

A portable electronic device may include a camera module that captures images or captures videos. In an example, the camera module may be mounted in a mobile phone, a notebook computer, a game machine, as non-limiting examples.

Resolution of the camera module and resolution of the imaging lens system may be proportional to a size of a sensor and a size of an imaging plane. In an example, in order to implement a camera module and an imaging lens system, having high resolution, a sensor and an imaging plane having a considerable size may be necessary. However, since a size (or a length) of the camera module and the imaging lens system increases in proportion to the size of the sensor and the image, it may be difficult to mount such a camera module and imaging lens system, having high resolution, in a thin electronic device such as a smartphone.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an imaging system includes a first lens, a second lens, a third lens, a fourth lens having a concave image side surface, a fifth lens having a concave object side surface, a sixth lens, a seventh lens, and an eighth lens, sequentially arranged from an object side to an imaging side, wherein TTL/2 ImgHT<0.6, where TTL is a distance from an object side surface of the first lens to an imaging plane, and 2 ImgHT is a diagonal length of the imaging plane.

The third lens may include a concave image side surface.
The fourth lens may include a convex object side surface.
The sixth lens may include a convex object side surface.
The sixth lens may include a concave image side surface.
The seventh lens may include a concave image side surface.

The third lens may include negative refractive power.
The fourth lens may include positive refractive power.

The imaging lens system wherein 1.0<f/f1<1.3 wherein, f is a focal length of the imaging lens system, and f1 is a focal length of the first lens.

The imaging lens system wherein 0.10 mm<f-L2IP<0.30 mm, wherein f is a focal length of the imaging lens system, and L2IP is a distance from an object side surface of the second lens to the imaging plane.

In a general aspect, an imaging lens system includes a first lens, a second lens, a third lens, a fourth lens, a fifth lens, a sixth lens, a seventh lens, and an eighth lens, sequentially arranged from an object side to an imaging side, wherein 0.10<D12/D23<0.20, and 0.50<TTL/2 ImgHT<0.60, where D12 is a distance from an image side surface of the first lens to an object side surface of the second lens, D23 is a distance from an image side surface of the second lens to an object side surface of the third lens, TTL is a distance from an object side surface of the first lens to an imaging plane, and 2 ImgHT is a diagonal length of the imaging plane.

The seventh lens may include a concave object side surface.

The eighth lens may include a convex image side surface.

The imaging lens system wherein 2.60<T1/T2<3.20, wherein T1 is a thickness of the first lens at a center of an optical axis, and T2 is a thickness of the second lens at the center of the optical axis.

The imaging lens system wherein 1.0<TTL/f<1.20, wherein f is a focal length of the imaging lens system.

The imaging lens system wherein −3.5<f2/f<0, wherein, f is a focal length of the imaging lens system, and f2 is a focal length of the second lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
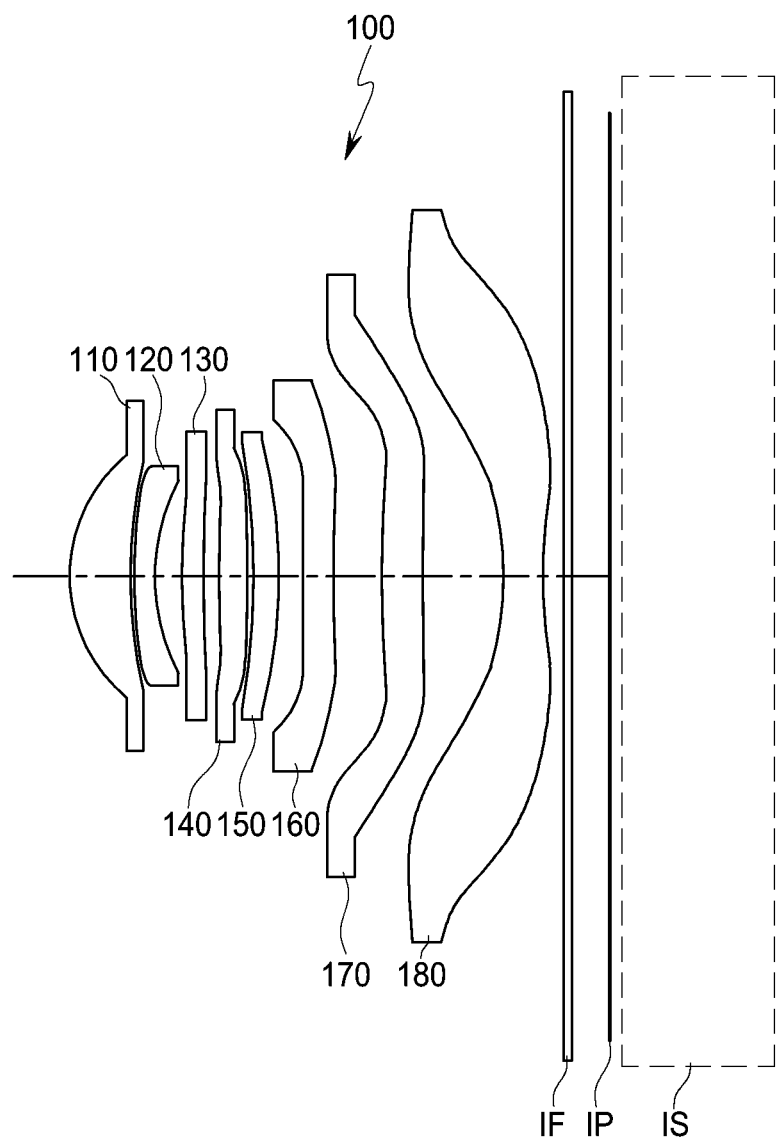
FIG. 1 illustrates a configuration diagram of an example imaging lens system, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

In one or more examples, the imaging lens system may be mountable in a portable electronic device.

In the one or more examples, a first lens refers to a lens most adjacent to an object (or a subject), and an eighth lens refers to a lens most adjacent to an imaging plane (or an image sensor). In the one or more examples, units of a radius of curvature, a thickness, a total track length (TTL) (a distance from an object side surface of the first lens to an imaging plane), a 2 ImgHT (a diagonal length of an imaging plane), an IMG_HT (half of a diagonal length of an imaging plane), and a focal length are indicated in millimeters (mm).

A thickness of a lens, a gap between lenses, and a TTL refer to a distance of a lens or track along an optical axis. Additionally, in the descriptions of a shape of a lens, a configuration in which one surface is convex indicates that a paraxial region of the surface is convex, and a configuration in which one surface is concave indicates that a paraxial region of the surface is concave. Thus, even when it is described that one surface of a lens is convex, an edge of the lens, or an area adjacent to the paraxial region may be concave. Similarly, even when it is described that one surface of a lens is concave, an edge of the lens may be convex.

An imaging lens system described in the one or more examples may be configured to be mounted in a portable electronic device. In an example, the imaging lens system may be mounted in a smartphone, a notebook computer, an augmented reality device, a virtual reality device (VR), a portable game machine, or the like, as non-limiting examples. Ranges and examples of use of an imaging lens system described in the one or more examples are not limited to the above-described electronic device. In an example, the imaging lens system may provide a narrow mounting space, but may be applied to an electronic device desirous of achieving high-resolution imaging.

An imaging lens system according to a first example may include a plurality of lenses. In an example, the imaging lens system may include a first lens, a second lens, a third lens, a fourth lens, a fifth lens, a sixth lens, a seventh lens, and an eighth lens, sequentially arranged from an object side to an imaging side.

In the imaging lens system according to the first example, a length of the imaging lens system (a distance from an object side surface of the first lens to an imaging plane: TTL)

and a diagonal length of the imaging plane (2 ImgHT) may form a predetermined conditional expression.

In an example, the imaging lens system according to the first example may satisfy the conditional expression TTL/2 ImgHT<0.6. Additionally, the imaging lens system according to the first example may include two or more lenses of which one surface is concave. In an example, the imaging lens system according to the first example may include a fourth lens having a concave image side surface and a fifth lens having a concave object side surface.

An imaging lens system according to a second example may include a plurality of lenses. In an example, the imaging lens system may include a first lens, a second lens, a third lens, a fourth lens, a fifth lens, a sixth lens, a seventh lens, and an eighth lens, sequentially arranged from an object side to an imaging side.

The imaging lens system according to the second example may form a predetermined numerical relationship in a gap ratio between the lenses. In an example, an air gap between the first lens and the second lens (a distance from an image side surface of the first lens to an object side surface of the second lens: D12) may be shorter than an air gap between the second lens and the third lens (a distance from an image side surface of the second lens to an object side surface of the third lens: D23). As another example, D12 and D23 may satisfy the conditional expression 0.10<D12/D23<0.20.

Additionally, in the imaging lens system according to the second example, a length of the imaging lens system (a distance from an object side surface of the first lens to an imaging plane: TTL) and a diagonal length of the imaging plane (2 ImgHT) may form a predetermined conditional expression. In an example, the imaging lens system according to the second example may satisfy the conditional expression 0.50<TTL/2 ImgHT<0.60.

The imaging lens system according to the one or more examples may satisfy one or more of the following conditional expressions:

$30 < V1-V2$ $3.15 < Nd2+Nd3$ $1.0 < TTL/f < 1.2$ $-0.1 \text{ mm} < f-L2IP$ $1.0 < f/f1 < 1.3$ $-3.5 < f2/f < 0$ $0 < D12/f < 0.04$ $0.30 < R1/f < 0.40$ $f/f2+f/f3 < -0.2$ In the above conditional expressions, V1 is an Abbe number of the first lens, V2 is an Abbe number of the second lens, Nd2 is a refractive index of the second lens, Nd3 is a refractive index of the third lens, f is a focal length of the imaging lens system, f1 is a focal length of the first lens, f2 is a focal length of the second lens, f3 is a focal length of the third lens, TTL is a distance from an object side surface of the first lens to the imaging plane, L2IP is a distance from an object side surface of the second lens to the imaging plane, D12 is a distance from an image side surface of the first lens to the object side surface of the second lens, and R1 is a curvature radius of the object side surface of the first lens.

The imaging lens system may satisfy some of the above-described conditional expressions in a more limited form, as follows:

$30 < V1-V2 < 40$ $3.15 < Nd2+Nd3 < 4.0$ $0.10 \text{ mm} < f-L2IP < 0.30 \text{ mm}$ $-0.60 < f/f2+f/f3 < -0.20$ The imaging lens system according to the one or more examples may further satisfy one or more of the following conditional expressions:

$0.13 < BFL/(IMG\ HT) < 0.15$ $0.20 < D12/D45 < 0.40$ $2.60 < T1/T2 < 3.20$

In the above conditional expression, BFL is a distance from an image side surface of the eighth lens to the imaging plane, D45 is a distance from an image side surface of the fourth lens to an object side surface of the fifth lens, T1 is a thickness of the first lens at a center of an optical axis, and T2 is a thickness of the second lens at the center of the optical axis.

The imaging lens system according to the one or more examples may include one or more lenses having the following characteristics, as necessary.

In an example, the imaging lens system according to the first example may include one of the first to eighth lenses according to the following characteristics. As another example, the imaging lens system according to the second example may include two or more of the first to eighth lenses according to the following characteristics. An imaging lens system according to the above-described example may not necessarily include a lens according to the following characteristics. Hereinafter, characteristics of the first to eighth lenses will be described.

The first lens may have refractive power. In an example, the first lens may have positive refractive power. The first lens may include a spherical surface or an aspherical surface. In an example, both surfaces of the first lens may be aspherical. The first lens may be formed of a material having high light transmittance and excellent workability. In an example, the first lens may be formed of a plastic material or a glass material. The first lens may be configured to have a predetermined refractive index. In an example, a refractive index of the first lens may be less than 1.6. As a specific example, the refractive index of the first lens may be greater than 1.52 and less than 1.57. The first lens may have a predetermined Abbe number. For example, the Abbe number of the first lens may be less than 60. As a specific example, the Abbe number of the first lens may be greater than 53 and less than 58.

The second lens may have refractive power. In an example, the second lens may have negative refractive power. The second lens may include a spherical surface or an aspherical surface. In an example, both surfaces of the second lens may be aspherical. The second lens may be formed of a material having high light transmittance and excellent workability. In an example, the second lens may be formed of a plastic material or a glass material. The second lens may be configured to have a predetermined refractive index. In an example, a refractive index of the second lens may be greater than 1.6. As a specific example, the refractive index of the second lens may be greater than 1.65 and less than 1.69. The second lens may have a predetermined Abbe number. In an example, the Abbe number of the second lens may be less than 30. As a specific example, the Abbe number of the second lens may be greater than 16 and less than 23.

The third lens may have refractive power. In an example, the third lens may have positive or negative refractive power. The third lens may have a shape of which one surface is concave. In an example, the third lens may have a concave image side surface. The third lens may include a spherical surface or an aspherical surface. In an example, both surfaces of the third lens may be aspherical. The third lens may be formed of a material having high light transmittance and excellent workability. In an example, the third lens may be formed of a plastic material or a glass material. The third lens may be configured to have a predetermined refractive index. In an example, a refractive index of the third lens may be greater than 1.5 and less than 1.7. The refractive index of the third lens may have a correlation with a refractive index of the fourth lens. In an example, when the refractive index of the fourth lens is less than 1.6, the refractive index of the third lens may be greater than 1.6. As another example, when the refractive index of the fourth lens is greater than 1.6, the refractive index of the third lens may be less than 1.6. In the former case, the refractive index of the third lens may be 1.63 to 1.68, and in the latter case, the refractive index of the third lens may be 1.52 to 1.56.

The fourth lens may have refractive power. In an example, the fourth lens may have positive refractive power. The fourth lens may have a shape of which one surface is convex. For example, the fourth lens may have a convex object side surface. The fourth lens may include a spherical surface or an aspherical surface. For example, both surfaces of the fourth lens may be aspherical. The fourth lens may be formed of a material having high light transmittance and excellent workability. In an example, the fourth lens may be formed of a plastic material or a glass material. The fourth lens may be configured to have a predetermined refractive index. In an example, a refractive index of the fourth lens may be greater than 1.5 and less than 1.7.

The fifth lens may have refractive power. In an example, the fifth lens may have positive or negative refractive power. The fifth lens may have a shape of which one surface is concave. In an example, the fifth lens may have a concave object side surface. The fifth lens may include a spherical surface or an aspherical surface. In an example, both surfaces of the fifth lens may be aspherical. The fifth lens may be formed of a material having high light transmittance and excellent workability. In an example, the fifth lens may be formed of a plastic material or a glass material. The fifth lens may be configured to have a predetermined refractive index. In an example, a refractive index of the fifth lens may be greater than 1.5. As a specific example, the refractive index of the fifth lens may be greater than 1.54 and less than 1.64. The fifth lens may have a predetermined Abbe number. In an example, the Abbe number of the fifth lens may be less than 60. As a specific example, the Abbe number of the fifth lens may be greater than 20 and less than 60.

The sixth lens may have refractive power. In an example, the sixth lens may have positive or negative refractive power. The sixth lens may have a shape of which one surface is convex. In an example, the sixth lens may have a convex object side surface. The sixth lens may have a shape of which one surface is concave. In an example, the sixth lens may have a concave image side surface. The sixth lens may include a spherical surface or an aspherical surface. In an example, both surfaces of the sixth lens may be aspherical. An inflection point may be formed on one or both surfaces of the sixth lens. In an example, an inflection point may be formed on an object side surface and an image side surface of the sixth lens. In addition, concave and convex shapes may be formed together on one or both surfaces of the sixth lens. In an example, an optical axis portion may be convex on an object side surface of the sixth lens, and a peripheral portion of the optical axis may be concave on an object side surface of the sixth lens. As another example, an optical axis portion may be concave on an image side surface of the sixth lens, and a peripheral portion of the optical axis may be convex on an image side surface of the sixth lens. As another example, an optical axis portion may be concave on an object side surface of the sixth lens, and a peripheral portion of the optical axis may be convex on an object side surface of the sixth lens. As another example, an optical axis portion may be convex on an image side surface of the sixth lens, and a peripheral portion of the optical axis may be concave on an image side surface of the sixth lens. The sixth lens may be formed of a material having high light transmittance and excellent workability. In an example, the sixth lens may be formed of a plastic material or a glass material. The sixth lens may be configured to have a predetermined refractive index. In an example, a refractive index of the sixth lens may be less than 1.7. As a specific example, the refractive index of the sixth lens may be greater than 1.56 and less than 1.70. The sixth lens may have a predetermined Abbe number. In an example, the Abbe number of the sixth lens may be less than 40. As a specific example, the Abbe number of the sixth lens may be greater than 20 and less than 40.

The seventh lens may have refractive power. In an example, the seventh lens may have positive refractive power. The seventh lens may have a shape of which one surface is concave. In an example, the seventh lens may have a concave object side surface. As another example, the seventh lens may have a concave image side surface. The seventh lens may include a spherical surface or an aspherical surface. In an example, both surfaces of the seventh lens may be aspherical. An inflection point may be formed on one or both surfaces of the seventh lens. In an example, an inflection point may be formed on an object side surface and an image side surface of the seventh lens. In addition, concave and convex shapes may be formed together on one or both surfaces of the seventh lens. In an example, an optical axis portion may be convex on an object side surface of the seventh lens, and a peripheral portion of the optical axis may be concave on an object side surface of the seventh lens. As another example, an optical axis portion may be concave on an image side surface of the seventh lens, and a peripheral portion of the optical axis may be convex on an image side surface of the seventh lens. However, a shape of the object side surface and a shape of the image side surface of the seventh lens are not limited to the above-described shape. In an example, the object side surface and the image side surface of the seventh lens may be formed opposite to the above-described shape. The seventh lens may be formed of a material having high light transmittance and excellent workability. In an example, the seventh lens may be formed of a plastic material or a glass material. The seventh lens may be configured to have a predetermined refractive index. For example, a refractive index of the seventh lens may be less than 1.6. As a specific example, the refractive index of the seventh lens may be greater than 1.52 and less than 1.57. The seventh lens may have a predetermined Abbe number. In an example, the Abbe number of the seventh lens may be less than 60. As a specific example, the Abbe number of the seventh lens may be greater than 53 and less than 58.

The eighth lens may have refractive power. In an example, the eighth lens may have positive or negative refractive power. The eighth lens may have a shape of which one surface is convex. In an example, the eighth lens may have a convex image side surface. The eighth lens may include a spherical surface or an aspherical surface. In an example, both surfaces of the eighth lens may be aspherical. An inflection point may be formed on one or both surfaces of the eighth lens. In an example, an inflection point may be formed on an object side surface and an image side surface of the eighth lens. In addition, concave and convex shapes may be formed together on one or both surfaces of the eighth lens. In an example, an optical axis portion may be concave on an object side surface of the eighth lens, and a peripheral portion of the optical axis may be concave on an object side surface of the eighth lens. As another example, an optical axis portion may be concave on an image side surface of the eighth lens, and a peripheral portion of the optical axis may be convex on an image side surface of the eighth lens. As another example, an optical axis portion may be convex on an image side surface of the eighth lens, and a peripheral portion of the optical axis may be concave on an image side surface of the eighth lens. The eighth lens may be formed of a material having high light transmittance and excellent workability. For example, the eighth lens may be formed of a plastic material or a glass material. The eighth lens may be configured to have a predetermined refractive index. In an example, a refractive index of the eighth lens may be less than 1.6. As a specific example, the refractive index of the eighth lens may be greater than 1.52 and less than 1.57. The eighth lens may have a predetermined Abbe number. In an example, the Abbe number of the eighth lens may be less than 60. As a specific example, the Abbe number of the eighth lens may be greater than 53 and less than 58.

The first to eighth lenses may include a spherical surface or an aspherical surface, as described above. When the first to eighth lenses include an aspherical surface, the aspherical surface of the corresponding lens may be expressed by the following Equation 1 below.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20}$$

Equation 1

In Equation 1, c is the reciprocal of a radius of curvature of a corresponding lens, k is a conic constant, r is a distance from any point on the aspherical surface to an optical axis, A to J are aspherical surface constants, and Z (or SAG) is a height in an optical axis direction from a certain point on the aspherical surface to a vertex of the corresponding aspherical surface.

An imaging lens system according to the above-described example may further include a stop and a filter. As an example, the imaging lens system may further include a stop disposed on an object side of the first lens or between a lens and a lens. As another example, the imaging lens system may further include a filter disposed between the eighth lens and the imaging plane. The stop may be configured to adjust an amount of light incident in an imaging plane direction, and the filter may be configured to block light of a specific wavelength. For reference, the filter described in the one or more examples may be configured to block infrared rays, but light of a wavelength to be blocked by the filter is not limited to the infrared rays.

Hereinafter, a specific embodiment of the imaging lens system will be described with reference to the drawings.

First, an imaging lens system according to a first embodiment will be described with reference to FIG. 1.

An imaging lens system 100 may include a first lens 110, a second lens 120, a third lens 130, a fourth lens 140, a fifth lens 150, a sixth lens 160, a seventh lens 170, and an eighth lens 180.

The first lens 110 may have positive refractive power, and may have a convex object side surface and a concave image side surface. The second lens 120 may have negative refractive power, and may have a convex object side surface and a concave image side surface. The third lens 130 may have negative refractive power, and may have a convex object side surface and a concave image side surface. The fourth lens 140 may have positive refractive power, and may have a convex object side surface and a concave image side surface. The fifth lens 150 may have negative refractive power, and may have a concave object side surface and a convex image side surface. The sixth lens 160 may have negative refractive power, and may have a convex object side surface and a concave image side surface. Additionally, an inflection point may be formed on an object side surface and an image side surface of the sixth lens 160. The seventh lens 170 may have positive refractive power, and may have a convex object side surface and a concave image side surface. In addition, an inflection point may be formed on an object side surface and an image side surface of the seventh lens 170. The eighth lens 180 may have negative refractive power, and has a concave object side surface and a concave image side surface. Additionally, an inflection point may be formed on an object side surface and an image side surface of the eighth lens 180.

The imaging lens system 100 may further include a filter IF and an imaging plane IP. The filter IF may be disposed between the eighth lens 180 and the imaging plane P. The imaging plane IP may be formed in a position in which an image is formed by light incident from the first lens 110 to the eighth lens 180. In an example, the imaging plane IP may be formed on one surface of an image sensor IS of a camera module or inside the image sensor IS.

Figure 2:
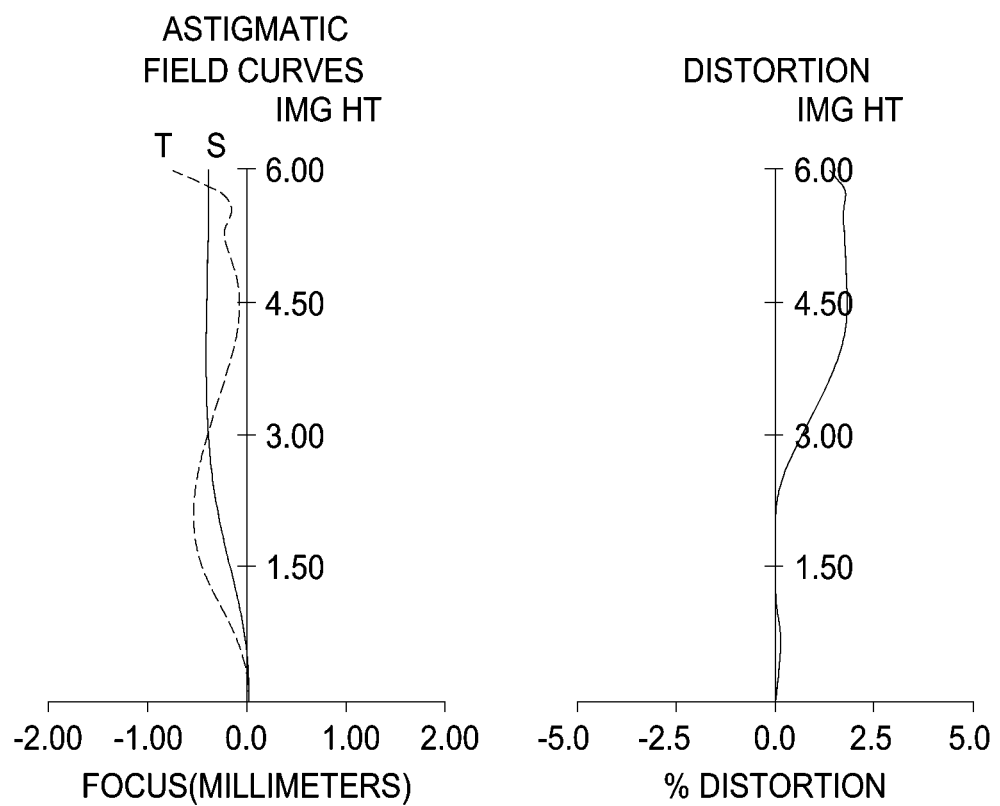
FIG. 2 illustrates an aberration curve of the example imaging lens system illustrated in FIG. 1.

The imaging lens system 100 configured as described above may exhibit aberration characteristics, as illustrated in FIG. 2. Tables 1 and 2 illustrate lens characteristics and aspheric values of the imaging lens system according to the present embodiment.

TABLE 1

| Surface No. | Component | Curvature Radius | Thickness/ Distance | Refractive Index | Abbe No. |
|---|---|---|---|---|---|
| S1 | 1st Lens | 2.0523 | 0.776 | 1.546 | 56.1 |
| S2 |  | 5.8717 | 0.047 |  |  |
| S3 | 2nd Lens | 6.5539 | 0.260 | 1.679 | 19.2 |
| S4 |  | 4.0199 | 0.337 |  |  |
| S5 | 3rd Lens | 6.0343 | 0.300 | 1.667 | 20.4 |
| S6 |  | 4.7699 | 0.201 |  |  |
| S7 | 4th Lens | 9.8754 | 0.360 | 1.546 | 56.1 |
| S8 |  | 11744.584 | 0.104 |  |  |
| S9 | 5th Lens | −7.0192 | 0.300 | 1.570 | 37.4 |
| S10 |  | −8.5085 | 0.317 |  |  |
| S11 | 6th Lens | 7.9018 | 0.400 | 1.644 | 23.5 |
| S12 |  | 6.4613 | 0.606 |  |  |
| S13 | 7th Lens | 4.4622 | 0.552 | 1.546 | 56.1 |
| S14 |  | 23.2642 | 1.041 |  |  |
| S15 | 8th Lens | −8.3725 | 0.500 | 1.537 | 55.7 |
| S16 |  | 3.7756 | 0.100 |  |  |
| S17 | Filter | Infinity | 0.110 | 1.518 | 64.2 |
| S18 |  | Infinity | 0.665 |  |  |

TABLE 1-continued

| Surface No. | Component | Curvature Radius | Thickness/ Distance | Refractive Index | Abbe No. |
|---|---|---|---|---|---|
| S19 | Imaging plane | Infinity | −0.025 | | |

TABLE 2

| Surface No. | S1 | S2 | S3 | S4 | S5 | S6 | S7 | S8 |
|---|---|---|---|---|---|---|---|---|
| K | 8.20E−04 | −7.38E+00 | 2.12E+00 | 1.04E+00 | −1.00E+00 | −4.74E+01 | −3.72E+00 | −7.08E+00 |
| A | −4.91E−02 | 1.66E−01 | 3.77E−02 | 1.71E−01 | 2.31E−01 | −1.85E−01 | 3.79E−02 | 3.24E−02 |
| B | 2.34E−01 | −1.92E+00 | −7.57E−01 | −1.89E+00 | −3.03E+00 | 1.86E+00 | −4.85E−01 | −1.22E−01 |
| C | −4.75E−01 | 1.05E+01 | 4.23E+00 | 1.24E+01 | 1.99E+01 | −1.10E+01 | 1.97E+00 | 1.01E−01 |
| D | −1.82E−01 | −3.60E+01 | −1.39E+01 | −5.18E+01 | −8.37E+01 | 4.10E+01 | −5.14E+00 | 1.20E−01 |
| E | 3.36E+00 | 8.46E+01 | 3.11E+01 | 1.49E+02 | 2.40E+02 | −1.04E+02 | 9.07E+00 | −4.14E−01 |
| F | −8.90E+00 | −1.41E+02 | −4.91E+01 | −3.05E+02 | −4.87E+02 | 1.85E+02 | −1.13E+01 | 5.24E−01 |
| G | 1.33E+01 | 1.70E+02 | 5.61E+01 | 4.55E+02 | 7.12E+02 | −2.39E+02 | 1.01E+01 | −4.00E−01 |
| H | −1.31E+01 | −1.50E+02 | −4.68E+01 | −4.99E+02 | −7.60E+02 | 2.24E+02 | −6.55E+00 | 2.04E−01 |
| J | 8.93E+00 | 9.69E+01 | 2.83E+01 | 4.03E+02 | 5.91E+02 | −1.53E+02 | 3.08E+00 | −7.17E−02 |

| Surface No. | S9 | S10 | S11 | S12 | S13 | S14 | S15 | S16 |
|---|---|---|---|---|---|---|---|---|
| K | 3.04E+00 | −6.51E+00 | −2.77E+00 | −1.00E+00 | −6.50E−01 | −2.43E+00 | 2.31E+00 | −1.00E+00 |
| A | 8.71E−02 | 5.70E−02 | −5.13E−02 | −7.09E−02 | −3.64E−02 | −2.95E−03 | −8.17E−02 | −9.11E−02 |
| B | −1.59E−01 | −1.82E−01 | 5.91E−02 | 5.32E−02 | −7.22E−02 | −2.01E−02 | 4.04E−02 | 4.22E−02 |
| C | 5.42E−03 | 3.95E−01 | −1.26E−01 | −4.77E−02 | 2.30E−02 | 2.73E−02 | −1.40E−02 | −1.53E−02 |
| D | 4.53E−01 | −7.75E−01 | 1.78E−01 | 3.23E−02 | −2.51E−02 | −2.27E−02 | 3.46E−03 | 3.98E−03 |
| E | −8.84E−01 | 1.21E+00 | −1.68E−01 | −1.47E−02 | 1.55E−02 | 1.18E−02 | −5.97E−04 | −7.47E−04 |
| F | 9.19E−01 | −1.39E+00 | 1.07E−01 | 4.07E−03 | −6.23E−03 | −4.10E−03 | 7.47E−05 | 1.02E−04 |
| G | −6.10E−01 | 1.16E+00 | −4.52E−02 | −4.31E−04 | 1.71E−03 | 9.94E−04 | −7.12E−06 | −1.03E−05 |
| H | 2.71E−01 | −6.98E−01 | 1.14E−02 | −1.27E−04 | −3.29E−04 | −1.72E−04 | 5.43E−07 | 7.64E−07 |
| J | −8.09E−02 | 3.04E−01 | −8.85E−04 | 6.43E−05 | 4.46E−05 | 2.13E−05 | −3.37E−08 | −4.20E−08 |

Figure 3:
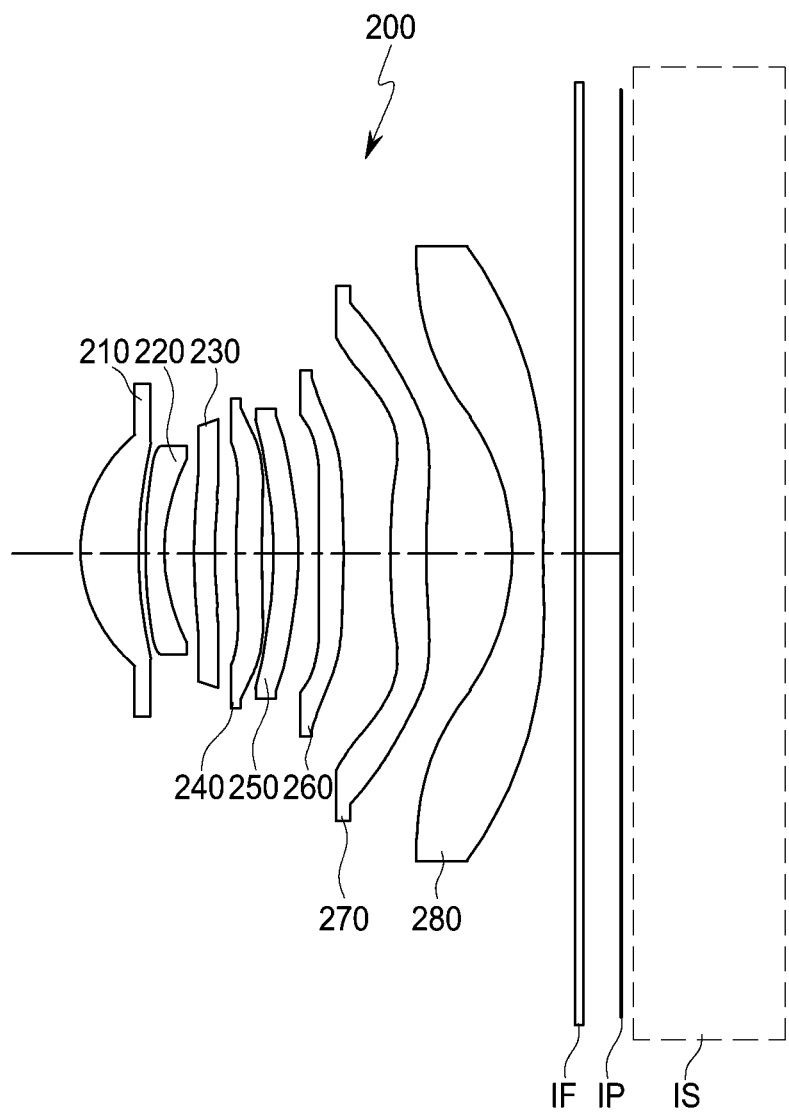
FIG. 3 illustrates a configuration diagram of an example imaging lens system, in accordance with one or more embodiments.

An imaging lens system, in accordance with one or more embodiments, will be described with reference to FIG. 3.

An imaging lens system 200 may include a first lens 210, a second lens 220, a third lens 230, a fourth lens 240, a fifth lens 250, a sixth lens 260, a seventh lens 270, and an eighth lens 280, arranged from an object side to an imaging side.

The first lens 210 may have positive refractive power, and may have a convex object side surface and a concave image side surface. The second lens 220 may have negative refractive power, and may have a convex object side surface and a concave image side surface. The third lens 230 may have negative refractive power, and may have a convex object side surface and a concave image side surface. The fourth lens 240 may have positive refractive power, and may have a convex object side surface and a concave image side surface. The fifth lens 250 may have negative refractive power, and may have a concave object side surface and a convex image side surface. The sixth lens 260 may have positive refractive power, and may have a convex object side surface and a concave image side surface. Additionally, an inflection point may be formed on an object side surface and an image side surface of the sixth lens 260. The seventh lens 270 may have positive refractive power, and may have a convex object side surface and a concave image side surface. Additionally, an inflection point may be formed on an object side surface and an image side surface of the seventh lens 270. The eighth lens 280 may have negative refractive power, and has a concave object side surface and a concave image side surface. In addition, an inflection point may be formed on an object side surface and an image side surface of the eighth lens 280.

The imaging lens system 200 may further include a filter IF and an imaging plane IP. The filter IF may be disposed between the eighth lens 280 and the imaging plane IP. The imaging plane IP may be formed in a position in which an image is formed by light incident from the first lens 210 to the eighth lens 280. In an example, the imaging plane IP may be formed on one surface of an image sensor IS of a camera module or inside the image sensor IS.

Figure 4:
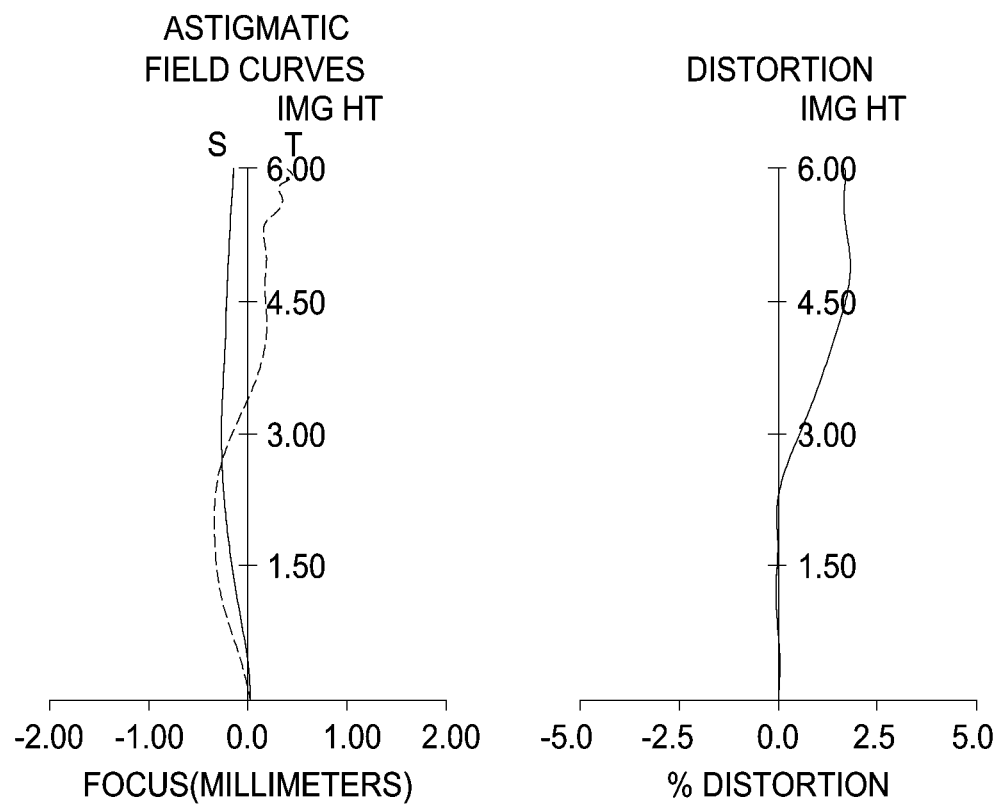
FIG. 4 illustrates an aberration curve of the example imaging lens system illustrated in FIG. 3.

The imaging lens system 200 configured as described above may exhibit aberration characteristics, as illustrated in FIG. 4. Tables 3 and 4 illustrate lens characteristics and aspheric values of the imaging lens system according to the present embodiment.

TABLE 3

| Surface No. | Component | Curvature Radius | Thickness/ Distance | Refractive Index | Abbe No. |
|---|---|---|---|---|---|
| S1 | 1st Lens | 2.1165 | 0.757 | 1.547 | 56.1 |
| S2 | | 6.0113 | 0.056 | | |
| S3 | 2nd Lens | 5.7730 | 0.277 | 1.679 | 19.2 |
| S4 | | 3.8057 | 0.360 | | |
| S5 | 3rd Lens | 6.4736 | 0.261 | 1.646 | 23.5 |
| S6 | | 5.5261 | 0.292 | | |
| S7 | 4th Lens | 8.0168 | 0.333 | 1.547 | 56.1 |
| S8 | | 10.6134 | 0.153 | | |
| S9 | 5th Lens | −6.0424 | 0.312 | 1.547 | 56.1 |
| S10 | | −6.4032 | 0.267 | | |
| S11 | 6th Lens | 9.0889 | 0.296 | 1.571 | 37.4 |
| S12 | | 10.6365 | 0.611 | | |
| S13 | 7th Lens | 3.8681 | 0.481 | 1.547 | 56.1 |
| S14 | | 12.7805 | 1.101 | | |
| S15 | 8th Lens | −9.5533 | 0.380 | 1.537 | 55.7 |
| S16 | | 3.5341 | 0.423 | | |
| S17 | Filter | Infinity | 0.110 | 1.519 | 64.2 |
| S18 | | Infinity | 0.512 | | |
| S19 | Imaging plane | Infinity | −0.022 | | |

TABLE 4

| Surface No. | S1 | S2 | S3 | S4 | S5 | S6 | S7 | S8 |
|---|---|---|---|---|---|---|---|---|
| K | −1.53E−03 | −2.68E+00 | 3.34E−01 | 5.79E−01 | −1.00E+00 | −1.00E+00 | 4.24E+00 | −6.83E+00 |
| A | 1.85E−03 | 4.05E−02 | −1.14E−01 | 2.76E−02 | 1.31E−01 | −1.34E−01 | −5.01E−02 | −6.20E−02 |
| B | −5.70E−02 | −7.11E−01 | 7.64E−01 | −2.51E−01 | −1.93E+00 | 8.90E−01 | 2.89E−02 | 1.88E−01 |
| C | 3.79E−01 | 3.75E+00 | −4.62E+00 | 5.42E−01 | 1.29E+01 | 5.09E+00 | −8.61E−02 | −6.96E−01 |
| D | −1.29E+00 | −1.25E+01 | 1.88E+01 | 5.82E+00 | −5.57E+01 | 1.91E+01 | 1.42E−01 | 1.58E+00 |
| E | 2.87E+00 | 2.89E+01 | −5.12E+01 | −4.98E+01 | 1.63E+02 | −4.95E+01 | −6.00E−02 | −2.39E+00 |
| F | −4.54E+00 | −4.86E+01 | 9.73E+01 | 1.95E+02 | −3.37E+02 | 9.08E+01 | −2.60E−01 | 2.51E+00 |
| G | 5.28E+00 | 5.99E+01 | −1.32E+02 | −4.77E+02 | 5.01E+02 | −1.21E+02 | 6.37E−01 | −1.88E+00 |
| H | −4.55E+00 | −5.43E+01 | 1.31E+02 | 7.93E+02 | −5.39E+02 | 1.17E+02 | −7.57E−01 | 1.02E+00 |
| J | 2.89E+00 | 3.60E+01 | −9.49E+01 | −9.19E+02 | 4.20E+02 | −8.32E+01 | 5.66E−01 | −3.97E−01 |

| Surface No. | S9 | S10 | S11 | S12 | S13 | S14 | S15 | S16 |
|---|---|---|---|---|---|---|---|---|
| K | −3.55E−03 | −1.04E−01 | −1.73E+00 | −9.79E−01 | −1.32E−01 | 1.84E−01 | 2.30E+00 | −1.00E+00 |
| A | 2.61E−02 | 2.36E−02 | −2.61E−02 | −6.73E−02 | −3.46E−02 | −2.84E−03 | −1.22E−01 | −1.30E−01 |
| B | −1.39E−01 | −1.06E−01 | −1.03E−01 | −4.45E−03 | −2.06E−02 | −2.50E−02 | 5.61E−02 | 6.35E−02 |
| C | 5.96E−01 | 3.18E−01 | 3.14E−01 | 7.40E−02 | 2.42E−02 | 1.83E−02 | −1.84E−02 | −2.43E−02 |
| D | −1.72E+00 | −6.81E−01 | −5.27E−01 | −1.12E−01 | −1.33E−02 | −5.98E−03 | 5.02E−03 | 6.87E−03 |
| E | 3.27E+00 | 9.95E−01 | 5.73E−01 | 9.40E−02 | 2.48E−03 | −8.68E−04 | −1.07E−03 | −1.40E−03 |
| F | −4.20E+00 | −1.01E+00 | −4.33E−01 | −5.07E−02 | 9.69E−04 | 1.58E−03 | 1.70E−04 | 2.03E−04 |
| G | 3.78E+00 | 7.27E−01 | 2.36E−01 | 1.84E−02 | −7.51E−04 | −6.77E−04 | −1.97E−05 | −2.13E−05 |
| H | −2.42E+00 | −3.80E−01 | −9.44E−02 | −4.51E−03 | 2.33E−04 | 1.65E−04 | 1.67E−06 | 1.60E−06 |
| J | 1.11E+00 | 1.45E−01 | 2.78E−02 | 7.31E−04 | −4.40E−05 | −2.64E−05 | −1.03E−07 | −8.61E−08 |

Figure 5:
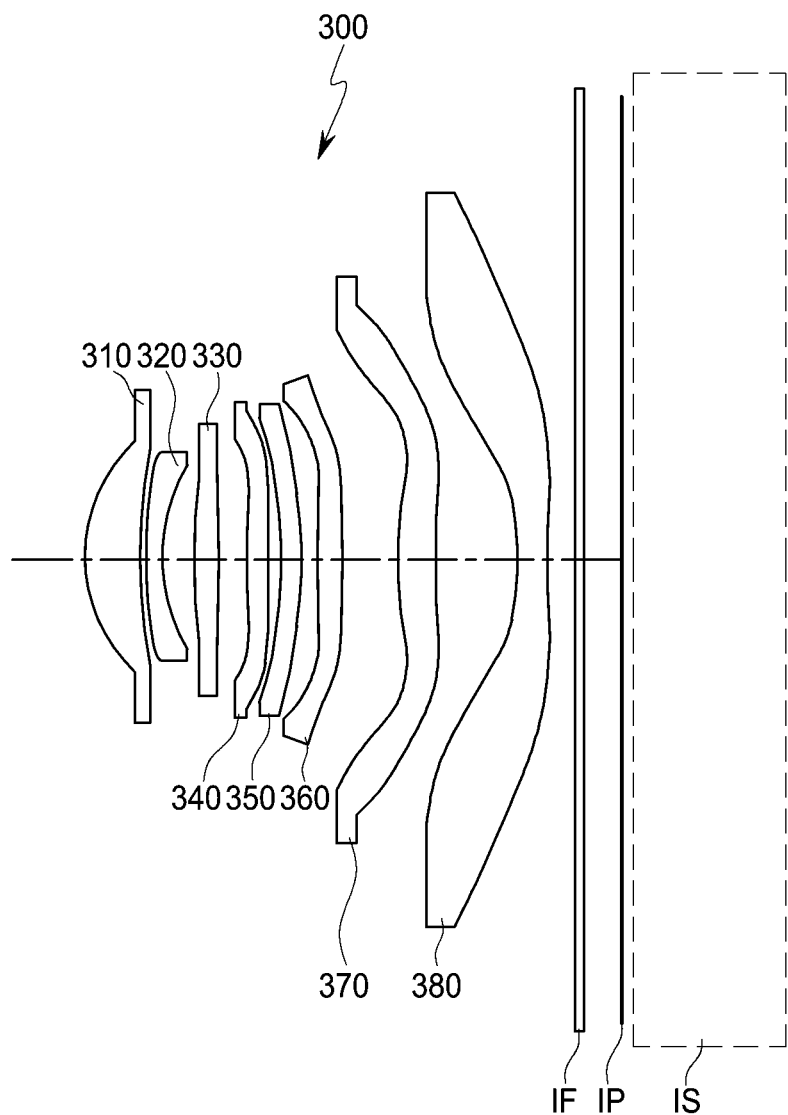
FIG. 5 illustrates a configuration diagram of an example imaging lens system, in accordance with one or more embodiments.

An imaging lens system according to a third example will be described with reference to FIG. 5.

An imaging lens system 300 may include a first lens 310, a second lens 320, a third lens 330, a fourth lens 340, a fifth lens 350, a sixth lens 360, a seventh lens 370, and an eighth lens 380, arranged from an object side to an imaging side.

The first lens 310 may have positive refractive power, and may have a convex object side surface and a concave image side surface. The second lens 320 may have negative refractive power, and may have a convex object side surface and a concave image side surface. The third lens 330 may have positive refractive power, and may have a convex object side surface and a convex image side surface. The fourth lens 340 may have positive refractive power, and may have a concave object side surface and a convex image side surface. The fifth lens 350 may have negative refractive power, and may have a concave object side surface and a convex image side surface. The sixth lens 360 may have negative refractive power, and may have a concave object side surface and a convex image side surface. Additionally, an inflection point may be formed on an object side surface and an image side surface of the sixth lens 360. The seventh lens 370 may have positive refractive power, and may have a concave object side surface and a convex image side surface. In addition, an inflection point may be formed on an object side surface and an image side surface of the seventh lens 370. The eighth lens 380 may have positive refractive power, and may have a concave object side surface and a convex image side surface. Additionally, an inflection point may be formed on an object side surface and an image side surface of the eighth lens 380.

The imaging lens system 300 may further include a filter IF and an imaging plane IP. The filter IF may be disposed between the eighth lens 380 and the imaging plane IP. The imaging plane IP may be formed in a position in which an image is formed by light incident from the first lens 310 to the eighth lens 380. In example, the imaging plane IP may be formed on one surface of an image sensor IS of a camera module or inside the image sensor IS.

Figure 6:
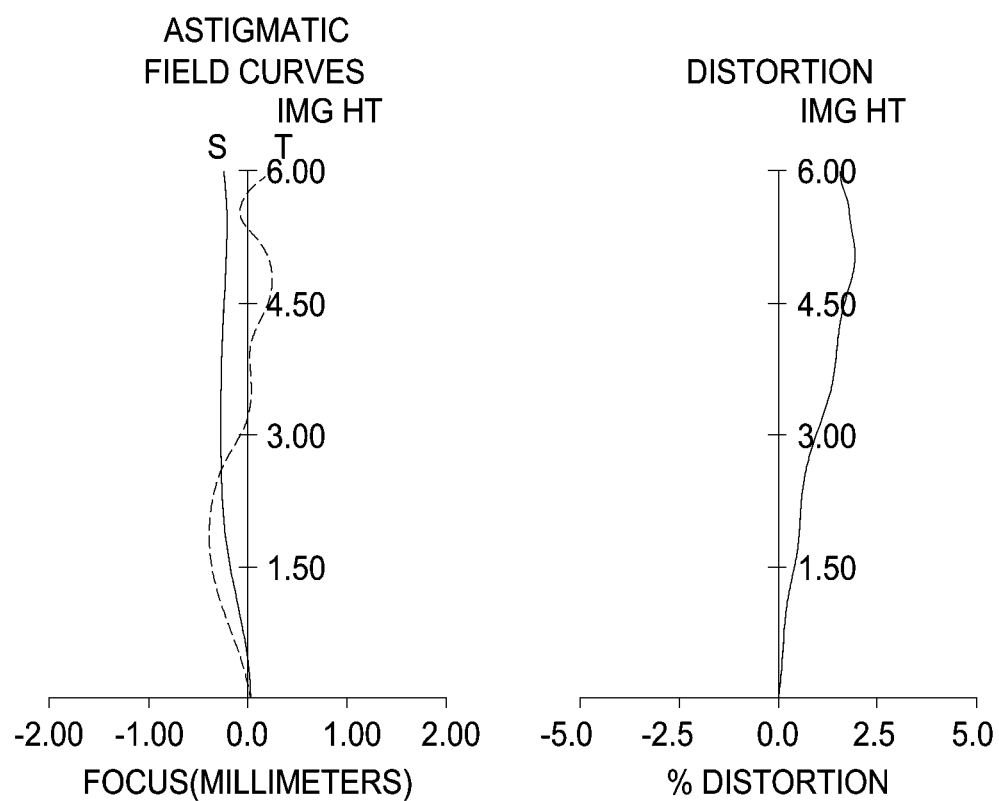
FIG. 6 illustrates an aberration curve of the example imaging lens system illustrated in FIG. 5.

The imaging lens system 300 configured as described above may exhibit aberration characteristics, as illustrated in FIG. 6. Tables 5 and 6 illustrate lens characteristics and aspheric values of the imaging lens system according to the present embodiment.

TABLE 5

| Surface No. | Component | Curvature Radius | Thickness/ Distance | Refractive Index | Abbe No. |
|---|---|---|---|---|---|
| S1 | 1st Lens | 2.1352 | 0.714 | 1.547 | 56.1 |
| S2 | | 6.1028 | 0.041 | | |
| S3 | 2nd Lens | 4.2164 | 0.240 | 1.679 | 19.2 |
| S4 | | 2.8683 | 0.396 | | |
| S5 | 3rd Lens | 17.7396 | 0.320 | 1.537 | 55.7 |
| S6 | | −32.7256 | 0.375 | | |
| S7 | 4th Lens | −7.1886 | 0.270 | 1.620 | 26.0 |
| S8 | | −6.2629 | 0.172 | | |
| S9 | 5th Lens | −6.1739 | 0.255 | 1.620 | 26.0 |
| S10 | | −6.7869 | 0.207 | | |
| S11 | 6th Lens | −4.1360 | 0.338 | 1.571 | 37.4 |
| S12 | | −6.4368 | 0.712 | | |
| S13 | 7th Lens | −6.5149 | 0.480 | 1.547 | 56.1 |
| S14 | | −6.1041 | 1.048 | | |
| S15 | 8th Lens | −10.5774 | 0.38 | 1.5371 | 55.7103 |
| S16 | | −10.6119 | 0.410635 | | |
| S17 | Filter | Infinity | 0.110 | 1.519 | 64.2 |
| S18 | | Infinity | 0.512 | | |
| S19 | Imaging plane | Infinity | −0.022 | | |

TABLE 6

| Surface No. | S1 | S2 | S3 | S4 | S5 | S6 | S7 | S8 |
|---|---|---|---|---|---|---|---|---|
| K | 5.09E−03 | 1.49E+00 | 1.39E+00 | 1.19E+00 | 1.41E+00 | 1.47E+00 | 1.67E+00 | 1.85E+00 |
| A | −6.15E−03 | 1.38E−02 | −1.36E−03 | −2.89E−03 | −2.75E−02 | −3.29E−02 | −6.70E−04 | −6.18E−02 |

TABLE 6-continued

| | | | | | | | | |
|---|---|---|---|---|---|---|---|---|
| B | −8.87E−04 | 3.50E−03 | 1.98E−03 | 4.75E−05 | −1.24E−03 | −2.42E−03 | 9.03E−03 | 1.11E−03 |
| C | −3.14E−04 | −9.12E−04 | −2.84E−04 | 1.43E−04 | 3.10E−04 | 4.97E−04 | 2.60E−03 | 1.57E−03 |
| D | −1.45E−04 | −1.34E−04 | −1.10E−04 | 2.60E−06 | −2.56E−05 | 1.38E−04 | 1.21E−04 | −1.95E−04 |
| E | −4.64E−05 | −1.53E−04 | −5.80E−06 | 2.41E−05 | −1.64E−04 | 5.60E−05 | −6.66E−05 | 1.93E−04 |
| F | −2.27E−05 | −7.29E−05 | 1.55E−05 | −4.72E−06 | −1.06E−04 | 1.73E−05 | −7.05E−05 | 1.47E−04 |
| G | −2.50E−05 | 8.35E−01 | 1.43E−01 | 3.08E−01 | 9.90E+01 | 4.96E+01 | 9.46E+00 | −8.43E+00 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

| Surface No. | S9 | S10 | S11 | S12 | S13 | S14 | S15 | S16 |
|---|---|---|---|---|---|---|---|---|
| K | 8.51E−01 | −5.03E−01 | 2.07E+00 | 2.39E+00 | 3.16E+00 | 3.38E+00 | 4.55E+00 | 4.76E+00 |
| A | −7.48E−03 | 7.85E−03 | −1.01E−01 | 1.03E−01 | 2.61E−01 | −4.64E−02 | −1.09E−01 | 2.90E−01 |
| B | 7.81E−04 | −1.58E−03 | −1.82E−02 | −4.96E−03 | −6.00E−02 | −7.99E−02 | 1.02E−01 | −1.72E−02 |
| C | 1.18E−03 | 1.20E−04 | 5.27E−04 | −1.63E−03 | 3.81E−03 | 1.33E−02 | 4.51E−02 | 1.73E−02 |
| D | −5.82E−04 | 6.71E−05 | −8.07E−05 | −1.51E−03 | 4.85E−03 | 8.99E−03 | 4.16E−02 | 8.80E−04 |
| E | 8.66E−05 | 4.29E−04 | 1.32E−04 | −2.78E−05 | −1.97E−04 | 2.11E−03 | 1.03E−02 | 2.95E−02 |
| F | 4.05E−05 | 3.79E−04 | −5.02E−05 | 1.91E−04 | −1.51E−03 | −2.10E−03 | 2.26E−03 | 6.79E−03 |
| G | 8.47E−05 | 1.02E−04 | −3.42E+00 | 6.97E−02 | 2.79E−01 | 1.41E−01 | 2.11E+00 | 1.21E+00 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

Figure 7:
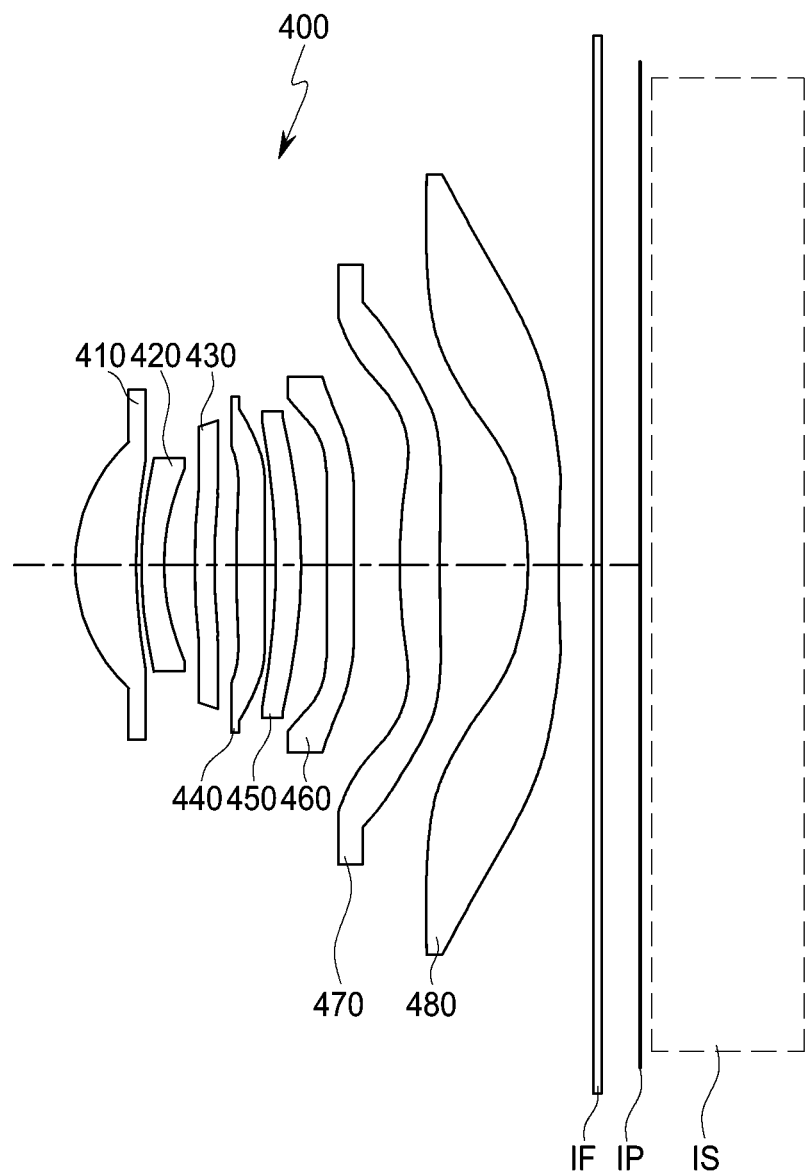
FIG. 7 illustrates a configuration diagram of an example imaging lens system, in accordance with one or more embodiments.

An imaging lens system according to a fourth example will be described with reference to FIG. 7.

An imaging lens system 400 may include a first lens 410, a second lens 420, a third lens 430, a fourth lens 440, a fifth lens 450, a sixth lens 460, a seventh lens 470, and an eighth lens 480, arranged from an object side to an imaging side.

The first lens 410 may have positive refractive power, and may have a convex object side surface and a concave image side surface. The second lens 420 may have negative refractive power, and may have a convex object side surface and a concave image side surface. The third lens 430 may have positive refractive power, and may have a convex object side surface and a concave image side surface. The fourth lens 440 may have positive refractive power, and may have a concave object side surface and a convex image side surface. The fifth lens 450 may have positive refractive power, and may have a concave object side surface and a convex image side surface. The sixth lens 460 may have negative refractive power, and may have a concave object side surface and a convex image side surface. Additionally, an inflection point may be formed on an object side surface and an image side surface of the sixth lens 460. The seventh lens 470 may have positive refractive power and may have a concave object side surface and a convex image side surface. Additionally, an inflection point may be formed on an object side surface and an image side surface of the seventh lens 470. The eighth lens 480 may have positive refractive power, and may have a concave object side surface and a convex image side surface. Additionally, an inflection point may be formed on an object side surface and an image side surface of the eighth lens 480.

The imaging lens system 400 may further include a filter IF and an imaging plane IP. The filter IF may be disposed between the eighth lens 480 and the imaging plane IP. The imaging plane IP may be formed in a position in which an image is formed by light incident from the first lens 410 to the eighth lens 480. In an example, the imaging plane IP may be formed on one surface of an image sensor IS of a camera module or inside the image sensor IS.

Figure 8:
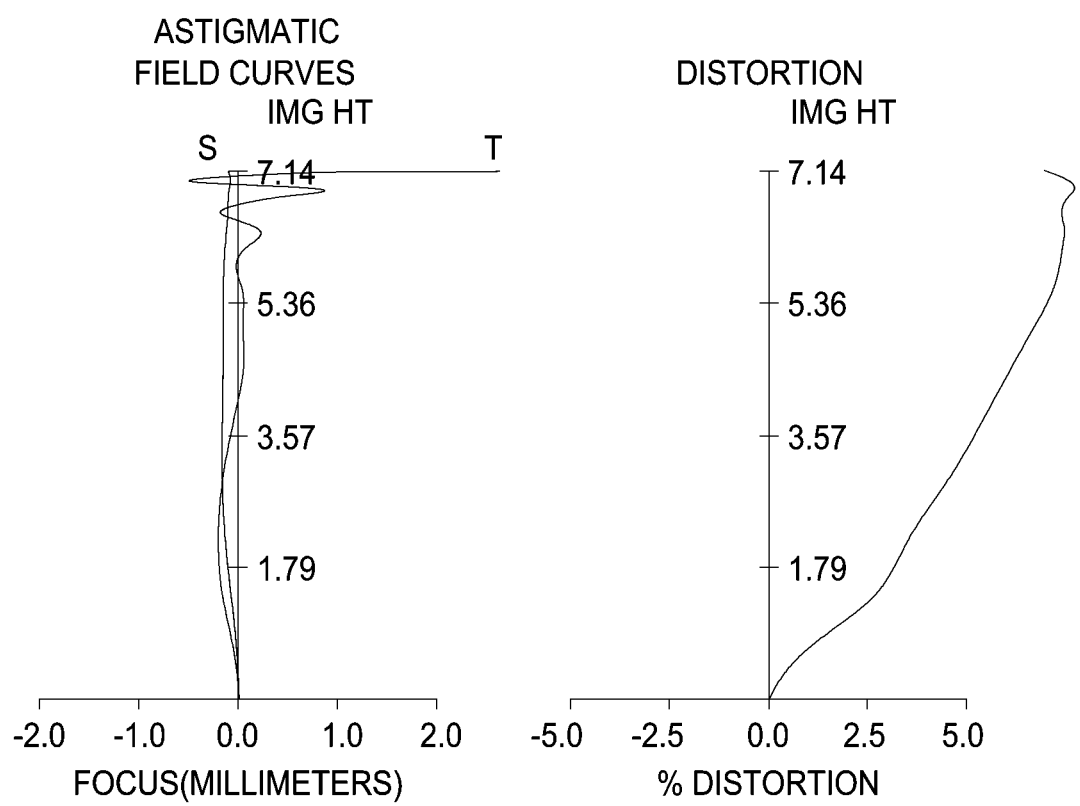
FIG. 8 illustrates an aberration curve of the example imaging lens system illustrated in FIG. 7.

The imaging lens system 400 configured as described above may exhibit aberration characteristics, as illustrated in FIG. 8. Tables 7 and 8 illustrate lens characteristics and aspheric values of the imaging lens system according to the present embodiment.

TABLE 7

| Surface No. | Component | Curvature Radius | Thickness/ Distance | Refractive Index | Abbe No. |
|---|---|---|---|---|---|
| S1 | 1st Lens | 2.4271 | 0.878 | 1.547 | 56.1 |
| S2 | | 8.3768 | 0.075 | | |
| S3 | 2nd Lens | 6.4127 | 0.326 | 1.679 | 19.2 |
| S4 | | 3.5296 | 0.421 | | |
| S5 | 3rd Lens | 20.7603 | 0.296 | 1.646 | 23.5 |
| S6 | | 34.6610 | 0.312 | | |
| S7 | 4th Lens | −12.9322 | 0.395 | 1.547 | 56.1 |
| S8 | | −5.5290 | 0.170 | | |
| S9 | 5th Lens | −10.2572 | 0.342 | 1.547 | 56.1 |
| S10 | | −9.3737 | 0.368 | | |
| S11 | 6th Lens | −4.7181 | 0.386 | 1.571 | 37.4 |
| S12 | | −8.2147 | 0.644 | | |
| S13 | 7th Lens | −7.5464 | 0.564 | 1.547 | 56.1 |
| S14 | | −7.2257 | 1.253 | | |
| S15 | 8th Lens | −11.9467 | 0.433865 | 1.5371 | 55.7103 |
| S16 | | −11.8586 | 0.532117 | | |
| S17 | Filter | Infinity | 0.110 | 1.519 | 64.2 |
| S18 | | Infinity | 0.503 | | |
| S19 | Imaging plane | Infinity | −0.013 | | |

TABLE 8

| Surface No. | S1 | S2 | S3 | S4 | S5 | S6 | S7 | S8 |
|---|---|---|---|---|---|---|---|---|
| K | 1.75E+00 | 1.65E+00 | 1.59E+00 | 1.39E+00 | 1.48E+00 | 1.61E+00 | 1.78E+00 | 2.26E+00 |
| A | 4.20E−03 | 4.68E−03 | −1.30E−03 | −5.52E−03 | −1.09E−02 | −9.79E−03 | −5.61E−03 | 6.66E−02 |
| B | 3.41E−04 | 2.08E−03 | 1.77E−03 | −9.20E−05 | −4.06E−03 | −2.22E−03 | −3.28E−04 | 1.37E−01 |
| C | 2.33E−04 | −1.22E−04 | −7.48E−05 | −1.16E−05 | −1.96E−03 | −2.41E−04 | 1.36E−04 | 6.28E−02 |
| D | 8.78E−05 | −1.46E−04 | −8.37E−05 | −3.85E−05 | −1.10E−03 | 1.95E−04 | −2.49E−06 | 2.35E−02 |
| E | −8.93E−05 | −9.29E−05 | −2.68E−05 | −4.19E−05 | −5.52E−04 | 1.66E−04 | 2.46E−05 | 5.58E−03 |

TABLE 8-continued

| | | | | | | | | |
|---|---|---|---|---|---|---|---|---|
| F | −7.83E−06 | −1.82E−06 | 1.28E−05 | −4.93E−05 | −2.02E−04 | 2.66E−05 | 1.02E−05 | 1.20E−04 |
| G | −3.03E−03 | −3.92E+00 | 4.35E−01 | 6.67E−01 | 9.86E+01 | 9.76E+01 | −2.77E+00 | −6.65E+00 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

| Surface No. | S9 | S10 | S11 | S12 | S13 | S14 | S15 | S16 |
|---|---|---|---|---|---|---|---|---|
| K | 2.09E+00 | 2.18E+00 | 2.38E+00 | 2.77E+00 | 3.53E+00 | 3.81E+00 | 5.25E+00 | 5.52E+00 |
| A | 3.09E−03 | −3.13E−02 | −1.23E−01 | 1.10E−01 | 2.02E−01 | 1.21E−02 | −2.10E−02 | 3.83E−01 |
| B | 6.20E−03 | 5.14E−03 | −1.96E−02 | −4.88E−03 | −2.92E−02 | −1.05E−01 | 2.02E−01 | 4.42E−02 |
| C | 1.84E−04 | −1.03E−03 | 3.21E−05 | 3.97E−03 | 2.76E−03 | 1.08E−02 | 3.76E−03 | −5.16E−02 |
| D | 2.71E−04 | −3.74E−05 | 4.49E−04 | −1.90E−03 | 1.84E−03 | 1.02E−02 | 8.93E−03 | −3.76E−02 |
| E | −9.55E−05 | 2.11E−04 | −6.54E−05 | −3.74E−04 | −8.95E−04 | 9.99E−04 | 1.07E−02 | 3.48E−02 |
| F | −8.40E−05 | −1.69E−05 | −5.93E−05 | 3.05E−05 | 4.84E−04 | 1.98E−04 | 1.88E−03 | 1.60E−02 |
| G | 1.60E+00 | 5.89E−01 | −8.84E−01 | −3.20E−02 | −9.26E−02 | 4.87E−01 | 2.32E+00 | 2.21E+00 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

Figure 9:
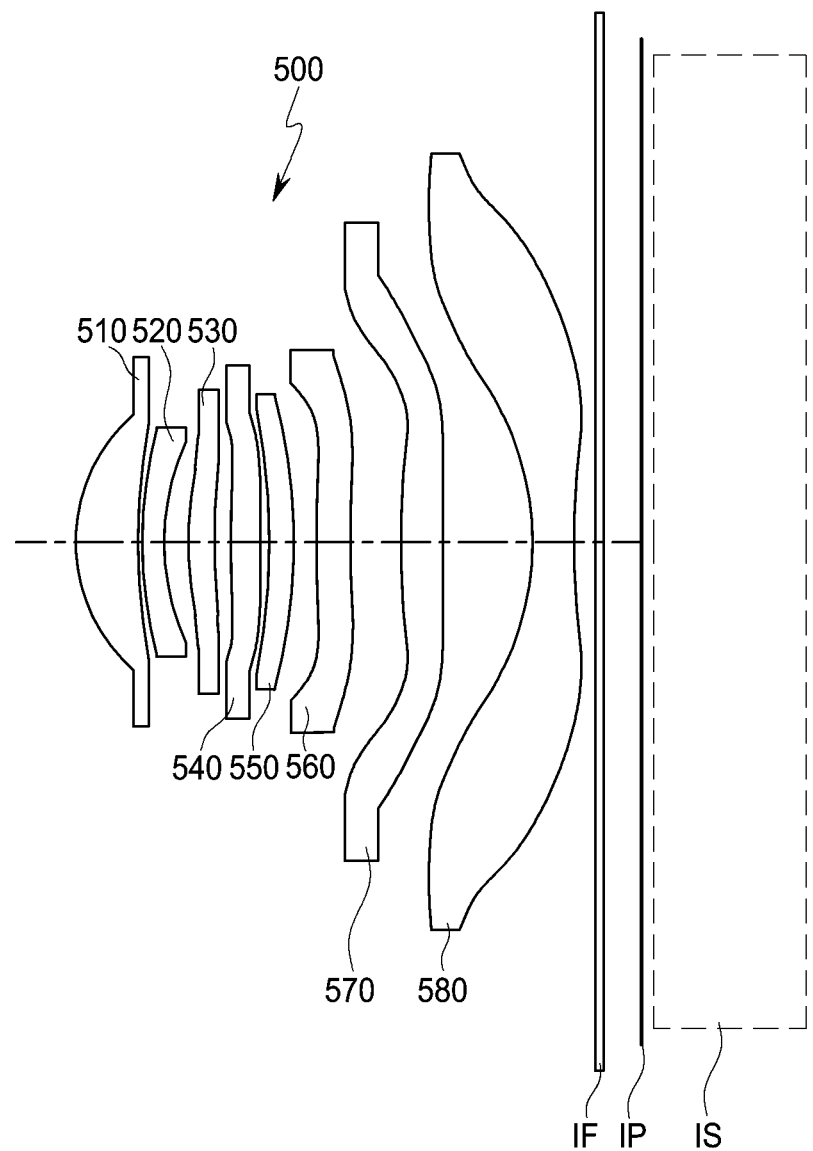
FIG. 9 illustrates a configuration diagram of an example imaging lens system, in accordance with one or more embodiments.

An imaging lens system according to a fifth example will be described with reference to FIG. 9.

An imaging lens system 500 may include a first lens 510, a second lens 520, a third lens 530, a fourth lens 540, a fifth lens 550, a sixth lens 560, a seventh lens 570, and an eighth lens 580, arranged from an object side to an imaging side.

The first lens 510 may have positive refractive power, and may have a convex object side surface and a concave image side surface. The second lens 520 may have negative refractive power, and may have a convex object side surface and a concave image side surface. The third lens 530 may have positive refractive power, and may have a convex object side surface and a concave image side surface. The fourth lens 540 may have positive refractive power, and may have a concave object side surface and a convex image side surface. The fifth lens 550 may have positive refractive power, and may have a concave object side surface and a convex image side surface. The sixth lens 560 may have negative refractive power, and may have a concave object side surface and a convex image side surface. Additionally, an inflection point may be formed on an object side surface and an image side surface of the sixth lens 560. The seventh lens 570 may have positive refractive power, and may have a concave object side surface and a convex image side surface. In addition, an inflection point may be formed on an object side surface and an image side surface of the seventh lens 570. The eighth lens 580 may have positive refractive power, and may have a concave object side surface and a convex image side surface. In addition, an inflection point may be formed on an object side surface and an image side surface of the eighth lens 580.

The imaging lens system 500 may further include a filter IF and an imaging plane IP. The filter IF may be disposed between the eighth lens 580 and the imaging plane IP. The imaging plane IP may be formed in a position in which an image is formed by light incident from the first lens 510 to the eighth lens 580. In an example, the imaging plane IP may be formed on one surface of an image sensor IS of a camera module or inside the image sensor IS.

Figure 10:
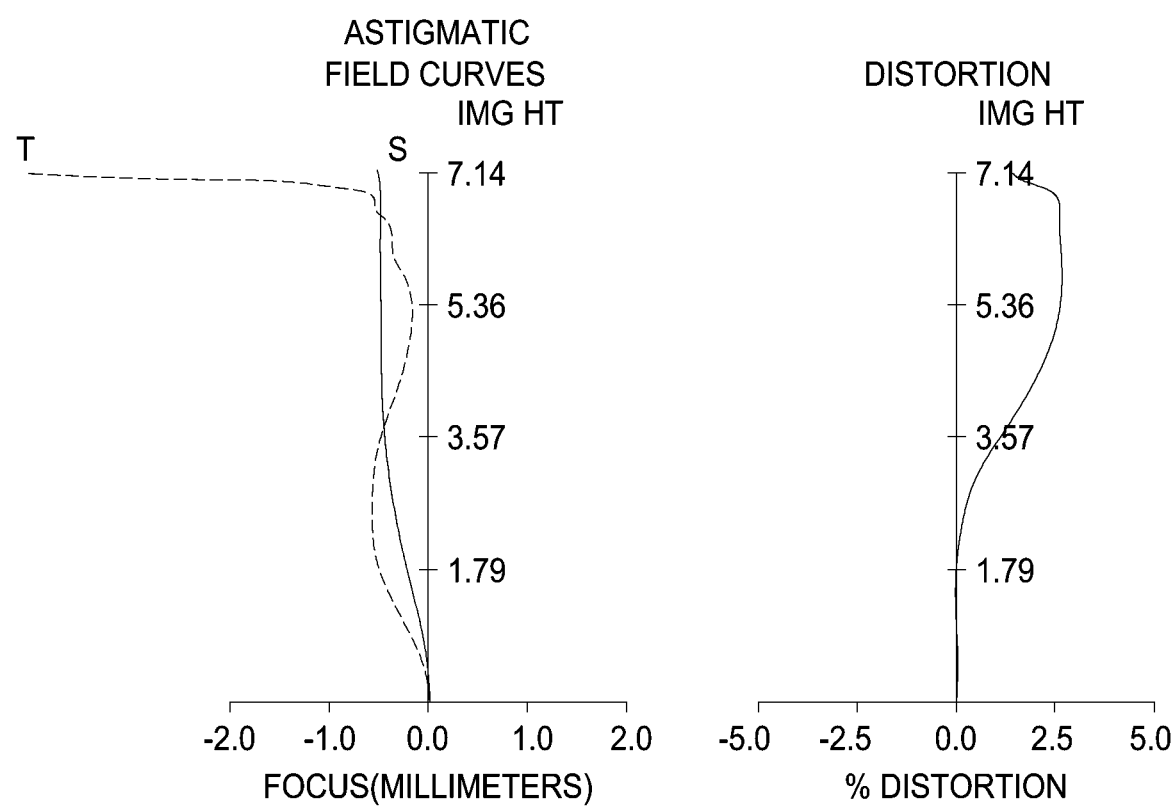
FIG. 10 illustrates an aberration curve of the example imaging lens system illustrated in FIG. 9.

The imaging lens system 500 configured as described above may exhibit aberration characteristics, as illustrated in FIG. 10. Tables 9 and 10 illustrate lens characteristics and aspheric values of the imaging lens system according to the present embodiment.

TABLE 9

| Surface No. | Component | Curvature Radius | Thickness/ Distance | Refractive Index | Abbe No. |
|---|---|---|---|---|---|
| S1 | 1st Lens | 2.4140 | 0.890 | 1.547 | 56.1 |
| S2 | | 7.3812 | 0.068 | | |
| S3 | 2nd Lens | 6.4557 | 0.309 | 1.679 | 19.2 |
| S4 | | 3.4646 | 0.372 | | |
| S5 | 3rd Lens | 16.8714 | 0.342 | 1.668 | 20.4 |
| S6 | | 36.2238 | 0.240 | | |
| S7 | 4th Lens | −12.0995 | 0.415 | 1.547 | 56.1 |
| S8 | | −4.9472 | 0.116 | | |
| S9 | 5th Lens | −10.2899 | 0.348 | 1.571 | 37.4 |
| S10 | | −8.5341 | 0.348 | | |
| S11 | 6th Lens | −4.8705 | 0.464 | 1.646 | 23.5 |
| S12 | | −16.9853 | 0.704 | | |
| S13 | 7th Lens | −8.6209 | 0.638 | 1.547 | 56.1 |
| S14 | | −6.5282 | 1.241 | | |
| S15 | 8th Lens | −13.6747 | 0.58 | 1.5371 | 55.7103 |
| S16 | | −12.5855 | 0.340438 | | |
| S17 | Filter | Infinity | 0.110 | 1.519 | 64.2 |
| S18 | | Infinity | 0.509 | | |
| S19 | Imaging plane | Infinity | −0.019 | | |

TABLE 10

| Surface No. | S1 | S2 | S3 | S4 | S5 | S6 | S7 | S8 |
|---|---|---|---|---|---|---|---|---|
| K | 1.75E+00 | 1.67E+00 | 1.64E+00 | 1.42E+00 | 1.54E+00 | 1.66E+00 | 1.89E+00 | 2.44E+00 |
| A | 4.83E−03 | 4.29E−03 | −1.24E−03 | −5.76E−03 | −1.16E−02 | −1.02E−02 | −4.96E−03 | 7.16E−02 |
| B | 4.96E−04 | 2.13E−03 | 2.09E−03 | −4.43E−04 | −4.42E−03 | −2.58E−03 | −2.30E−03 | 1.45E−01 |
| C | 3.37E−04 | −2.82E−04 | −3.88E−05 | −4.01E−04 | −1.83E−03 | 4.65E−04 | 1.35E−03 | 6.81E−02 |
| D | 2.04E−04 | −1.71E−04 | −8.61E−05 | −2.44E−04 | −1.45E−03 | 1.01E−04 | −5.50E−04 | 2.43E−02 |
| E | 5.71E−05 | −2.90E−04 | −1.56E−04 | −1.16E−04 | −6.73E−04 | 2.37E−04 | 1.05E−04 | 5.62E−03 |
| F | −2.17E−05 | −4.81E−05 | −3.13E−05 | 1.24E−05 | −2.17E−04 | 1.19E−04 | −2.25E−04 | −1.69E−06 |
| G | 2.60E−03 | −7.08E+00 | 2.13E+00 | 1.05E+00 | 9.90E+01 | −5.01E+01 | −1.11E+00 | −6.85E+00 |

TABLE 10-continued

| Surface No | S9 | S10 | S11 | S12 | S13 | S14 | S15 | S16 |
|---|---|---|---|---|---|---|---|---|
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |
| K | 2.07E+00 | 2.15E+00 | 2.44E+00 | 3.08E+00 | 3.76E+00 | 4.08E+00 | 5.75E+00 | 6.04E+00 |
| A | 2.64E-03 | -2.67E-02 | -1.31E-01 | 1.11E-01 | 2.19E-01 | -1.58E-01 | 1.12E-01 | 5.39E-01 |
| B | 6.87E-03 | 6.49E-04 | -1.96E-02 | 2.97E-04 | -4.07E-02 | -1.22E-01 | 1.11E-01 | -5.53E-02 |
| C | -1.35E-03 | -7.91E-04 | -7.12E-04 | 5.56E-03 | 8.23E-03 | 1.40E-02 | -1.73E-03 | 7.62E-02 |
| D | 7.26E-05 | -3.43E-04 | 4.27E-04 | -1.88E-03 | 1.09E-03 | 3.94E-03 | -1.81E-02 | 1.08E-01 |
| E | -4.76E-05 | 3.79E-04 | 2.07E-04 | -1.57E-03 | -1.81E-03 | -5.70E-04 | 2.81E-03 | -1.04E-01 |
| F | -1.16E-04 | 1.30E-04 | 2.29E-04 | 3.34E-05 | -1.27E-03 | 1.03E-03 | 3.88E-03 | -3.02E-02 |
| G | 6.07E-01 | -5.09E+00 | -2.75E+00 | 1.91E+01 | -6.98E-01 | -3.17E+00 | 2.02E+00 | 2.21E+00 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

Figure 11:
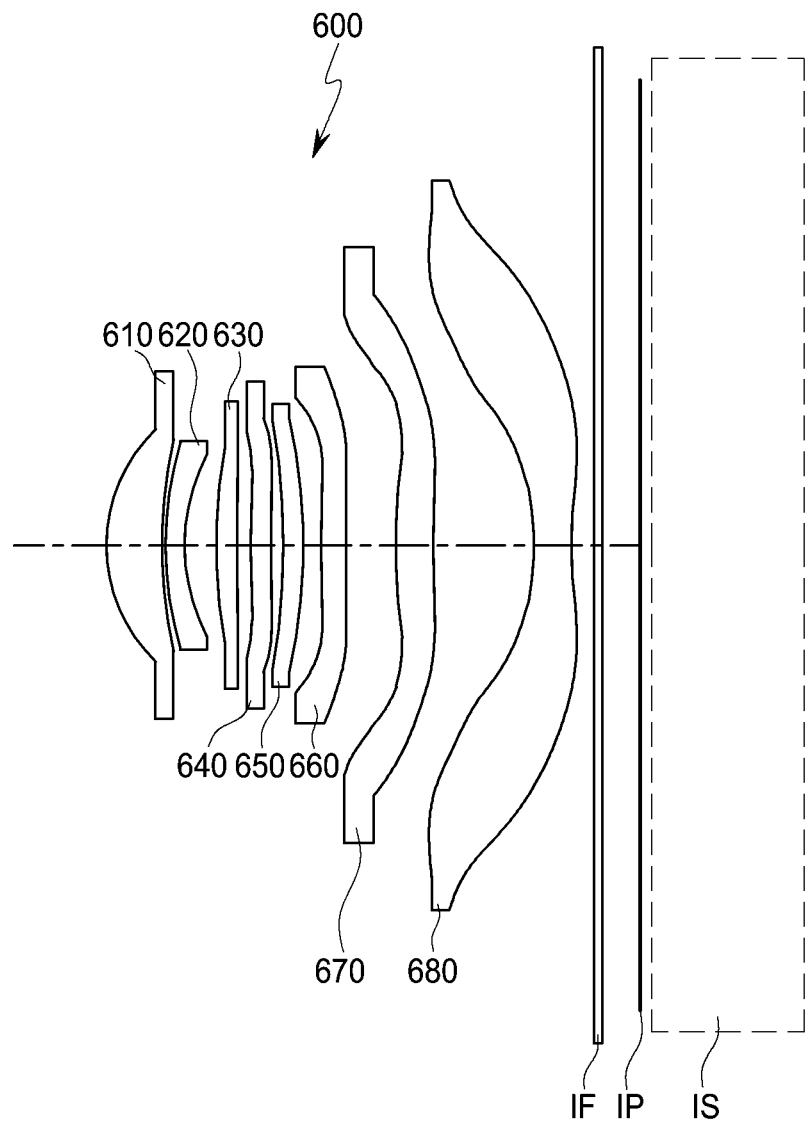
FIG. 11 illustrates a configuration diagram of an example imaging lens system, in accordance with one or more embodiments.

An imaging lens system according to a sixth example will be described with reference to FIG. 11.

An imaging lens system 600 may include a first lens 610, a second lens 620, a third lens 630, a fourth lens 640, a fifth lens 650, a sixth lens 660, a seventh lens 670, and an eighth lens 680, arranged from an object side to an imaging side.

The first lens 610 may have positive refractive power, and may have a convex object side surface and a concave image side surface. The second lens 620 may have negative refractive power, and may have a convex object side surface and a concave image side surface. The third lens 630 may have positive refractive power, and may have a convex object side surface and a concave image side surface. The fourth lens 640 may have positive refractive power, and may have a convex object side surface and a concave image side surface. The fifth lens 650 may have negative refractive power, and may have a concave object side surface and a convex image side surface. The sixth lens 660 may have negative refractive power, and may have a convex object side surface and a concave image side surface. In addition, an inflection point may be formed on an object side surface and an image side surface of the sixth lens 660. The seventh lens 670 may have positive refractive power, and may have a convex object side surface and a concave image side surface. In addition, an inflection point may be formed on an object side surface and an image side surface of the seventh lens 670. The eighth lens 680 may have negative refractive power, and may have a concave object side surface and a concave image side surface. In addition, an inflection point may be formed on an object side surface and an image side surface of the eighth lens 680.

The imaging lens system 600 may further include a filter IF and an imaging plane IP. The filter IF may be disposed between the eighth lens 680 and the imaging plane IP. The imaging plane IP may be formed in a position in which an image is formed by light incident from the first lens 610 to the eighth lens 680. For example, the imaging plane IP may be formed on one surface of an image sensor IS of a camera module or inside the image sensor IS.

Figure 12:
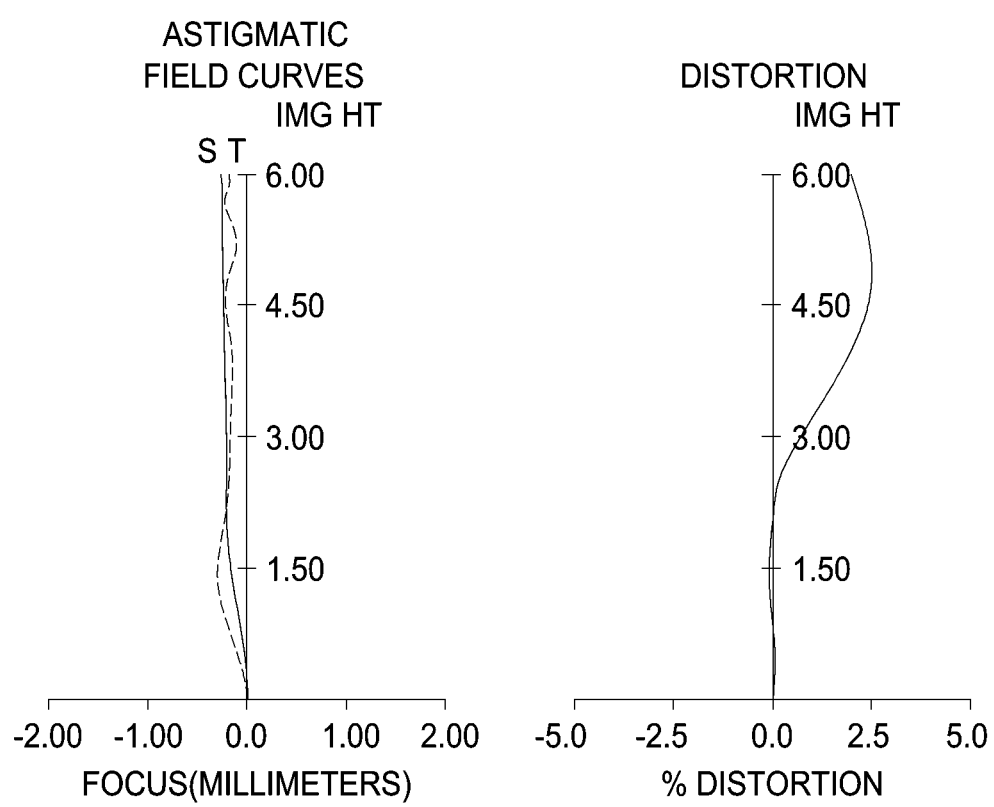
FIG. 12 illustrates an aberration curve of the example imaging lens system illustrated in FIG. 11.

The imaging lens system 600 configured as described above may exhibit aberration characteristics, as illustrated in FIG. 12. Tables 11 and 12 illustrate lens characteristics and aspheric values of the imaging lens system according to the present embodiment.

TABLE 11

| Surface No. | Component | Curvature Radius | Thickness/ Distance | Refractive Index | Abbe No. |
|---|---|---|---|---|---|
| S1 | 1st Lens | 2.0356 | 0.722 | 1.546 | 56.0 |
| S2 | | 5.3218 | 0.044 | | |
| S3 | 2nd Lens | 5.3331 | 0.243 | 1.689 | 18.2 |
| S4 | | 3.4928 | 0.409 | | |
| S5 | 3rd Lens | 5.6793 | 0.260 | 1.668 | 20.4 |
| S6 | | 5.6787 | 0.199 | | |
| S7 | 4th Lens | 10.2694 | 0.250 | 1.537 | 55.7 |
| S8 | | 17.9751 | 0.156 | | |
| S9 | 5th Lens | -8.8879 | 0.250 | 1.571 | 37.4 |
| S10 | | -9.0960 | 0.240 | | |
| S11 | 6th Lens | 7.8300 | 0.321 | 1.689 | 18.2 |
| S12 | | 6.2173 | 0.638 | | |
| S13 | 7th Lens | 4.1436 | 0.489 | 1.546 | 56.0 |
| S14 | | 15.1720 | 1.284 | | |
| S15 | 8th Lens | -7.3811 | 0.487453 | 1.53714 | 55.7354 |
| S16 | | 4.2810 | 0.287924 | | |
| S17 | Filter | Infinity | 0.110 | 1.519 | 64.2 |
| S18 | | Infinity | 0.500 | | |
| S19 | Imaging plane | Infinity | -0.010 | | |

TABLE 12

| Surface No. | S1 | S2 | S3 | S4 | S5 | S6 | S7 | S8 |
|---|---|---|---|---|---|---|---|---|
| K | -8.06E-04 | -5.26E+00 | 1.96E+00 | 1.06E+00 | 1.14E-01 | -2.45E+01 | -6.36E+00 | 8.53E+01 |
| A | 1.62E-04 | 1.05E-02 | 1.84E-02 | 9.47E-03 | 3.45E-04 | 7.39E-04 | -5.20E-03 | -4.63E-03 |
| B | 3.05E-04 | 7.50E-04 | 1.37E-04 | 2.40E-04 | 1.09E-04 | 1.59E-03 | -2.15E-03 | -1.10E-03 |
| C | 1.63E-04 | 2.33E-05 | 1.54E-04 | -1.02E-04 | -1.86E-04 | 4.86E-05 | -3.58E-04 | -4.47E-04 |
| D | 7.58E-05 | -4.95E-05 | 1.68E-05 | -6.65E-05 | -9.92E-05 | 2.08E-04 | 6.65E-05 | -3.95E-05 |
| E | 3.33E-05 | -1.41E-05 | 1.12E-05 | -3.70E-05 | -4.22E-05 | 8.12E-05 | -2.28E-05 | -2.43E-05 |
| F | 2.49E-05 | -6.40E-06 | 1.01E-05 | -1.12E-05 | -3.24E-05 | 1.66E-05 | -6.58E-05 | -4.90E-05 |
| G | -4.12E-06 | -8.32E-06 | 1.01E-05 | -9.51E-06 | -1.45E-05 | 2.31E-05 | -3.98E-05 | 8.19E-06 |
| H | 0.00E+00 | 0.00E+00 | 0.00E+00 | 0.00E+00 | 0.00E+00 | 0.00E+00 | 0.00E+00 | 0.00E+00 |

TABLE 12-continued

| | | | | | | | | |
|---|---|---|---|---|---|---|---|---|
| J | 0.00E+00 | 0.00E+00 | 0.00E+00 | 0.00E+00 | 0.00E+00 | 0.00E+00 | 0.00E+00 | 0.00E+00 |

| Surface No. | S9 | S10 | S11 | S12 | S13 | S14 | S15 | S16 |
|---|---|---|---|---|---|---|---|---|
| K | 1.31E+00 | −1.26E+01 | −3.52E+00 | −1.43E+00 | −1.42E+00 | −7.30E−01 | −1.00E+00 | −1.01E+00 |
| A | −1.13E−02 | 4.14E−03 | −1.02E−02 | 1.13E−01 | 3.25E−01 | 2.22E−01 | 8.21E−01 | 1.17E+00 |
| B | −1.21E−03 | −4.09E−03 | 3.21E−03 | 7.25E−03 | −1.55E−02 | −2.56E−02 | 2.11E−01 | 1.80E−01 |
| C | −8.90E−04 | −3.62E−04 | 3.38E−04 | 4.22E−04 | 4.24E−03 | 2.43E−03 | 1.82E−02 | 8.89E−03 |
| D | −1.59E−04 | −8.43E−05 | 4.11E−05 | 4.28E−04 | −4.18E−04 | −2.97E−04 | 3.95E−04 | 7.39E−03 |
| E | 1.26E−04 | 1.88E−04 | 3.55E−07 | −9.14E−05 | 1.90E−04 | −8.49E−05 | 1.73E−03 | 3.33E−03 |
| F | −2.84E−05 | 3.34E−05 | 1.36E−05 | −2.19E−05 | −1.24E−04 | 2.62E−05 | 8.50E−04 | 1.61E−04 |
| G | −3.82E−06 | 1.45E−05 | 1.25E−05 | −1.21E−05 | −3.68E−05 | −1.10E−04 | 1.19E−04 | −6.02E−05 |
| H | 0.00E+00 | 0.00E+00 | 0.00E+00 | 0.00E+00 | 0.00E+00 | 0.00E+00 | 0.00E+00 | 0.00E+00 |
| J | 0.00E+00 | 0.00E+00 | 0.00E+00 | 0.00E+00 | 0.00E+00 | 0.00E+00 | 0.00E+00 | 0.00E+00 |

Tables 13 and 14 show optical characteristic values and conditional expression values of the imaging lens systems according to the first to sixth examples.

TABLE 13

| | $1^{st}$ Example | $2^{nd}$ Example | $3^{rd}$ Example | $4^{th}$ Example | $5^{th}$ Example | $6^{th}$ Example |
|---|---|---|---|---|---|---|
| f | 6.3000 | 6.3940 | 6.3944 | 7.0394 | 7.3034 | 6.4000 |
| f1 | 5.3922 | 5.5935 | 5.6503 | 5.9432 | 6.1732 | 5.5994 |
| f2 | −15.9779 | −17.4444 | −14.2403 | −12.1190 | −11.4940 | −15.5238 |
| f3 | −37.7330 | −65.5914 | 21.4658 | 79.5272 | 46.9200 | 465.5480 |
| f4 | 18.0910 | 57.3588 | 70.5613 | 17.3457 | 15.0065 | 44.0979 |
| f5 | −75.9179 | −282.4581 | −131.0932 | 175.1529 | 81.7452 | −1207.9699 |
| f6 | −61.7558 | 102.3461 | −21.4161 | −20.2322 | −10.7397 | −47.6758 |
| f7 | 10.0095 | 9.9599 | 125.3674 | 191.8396 | 44.4231 | 10.2729 |
| f8 | −4.7810 | −4.7549 | 2126.4071 | 1100.4057 | 248.0365 | −4.9717 |
| TTL | 6.9500 | 6.9597 | 6.9593 | 7.9967 | 8.0164 | 6.8800 |
| BFL | 0.8500 | 1.0232 | 1.0106 | 1.1321 | 0.9404 | 0.8879 |
| IMG HT | 6.0000 | 6.0000 | 6.0000 | 7.1450 | 7.1450 | 6.0000 |

TABLE 14

| Conditional Expression | $1^{st}$ Example | $2^{nd}$ Example | $3^{rd}$ Example | $4^{th}$ Example | $5^{th}$ Example | $6^{th}$ Example |
|---|---|---|---|---|---|---|
| TTL/2ImgHT | 0.57917 | 0.57997 | 0.57994 | 0.55960 | 0.56098 | 0.57333 |
| V1 − V2 | 36.86424 | 36.86420 | 36.86420 | 36.86420 | 36.86420 | 37.83790 |
| Nd2 + Nd3 | 3.34540 | 3.32440 | 3.21598 | 3.32440 | 3.34720 | 3.35748 |
| TTL/f | 1.10317 | 1.08847 | 1.08834 | 1.13599 | 1.09764 | 1.07500 |
| f − L2IP | 0.17354 | 0.24703 | 0.19045 | −0.00455 | 0.24468 | 0.28572 |
| f/f1 | 1.16835 | 1.14310 | 1.13169 | 1.18445 | 1.18307 | 1.14297 |
| D12/f | 0.00748 | 0.00878 | 0.00648 | 0.01068 | 0.00930 | 0.00688 |
| R1/f | 0.32576 | 0.33102 | 0.33391 | 0.34479 | 0.33054 | 0.31806 |
| f/f2 + f/f3 | −0.56126 | −0.46402 | −0.15115 | −0.49234 | −0.47975 | −0.39852 |
| BFL/(IMG HT) | 0.14167 | 0.17054 | 0.16844 | 0.15845 | 0.13162 | 0.14799 |
| D12/D23 | 0.13999 | 0.15601 | 0.10461 | 0.17879 | 0.18249 | 0.10759 |
| D12/D45 | 0.45487 | 0.36642 | 0.24049 | 0.44331 | 0.58532 | 0.28299 |
| T1/T2 | 2.98785 | 2.72982 | 2.97448 | 2.68939 | 2.88233 | 2.97088 |

An imaging lens system according to the present disclosure may be mounted in a thin portable electronic device.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
    a first lens having positive refractive power, a second lens having negative refractive power, a third lens, a fourth lens having positive refractive power and a concave image side surface, a fifth lens having negative refractive power and a concave object side surface, a sixth lens, a seventh lens, and an eighth lens, sequentially arranged from an object side toward an imaging plane,
    wherein 0.50<TTL/2 ImgHT<0.60, where TTL is a distance from an object side surface of the first lens to the imaging plane, and 2 ImgHT is a diagonal length of the imaging plane.

2. The imaging lens system of claim 1, wherein the third lens comprises a concave image side surface.

3. The imaging lens system of claim 1, wherein the fourth lens comprises a convex object side surface.

4. The imaging lens system of claim 1, wherein the sixth lens comprises a convex object side surface.

5. The imaging lens system of claim 1, wherein the sixth lens comprises a concave image side surface.

6. The imaging lens system of claim 1, wherein the seventh lens comprises a concave image side surface.

7. The imaging lens system of claim 1, wherein the third lens comprises negative refractive power.

8. The imaging lens system of claim 1, wherein $$1.0 < f/f1 < 1.3,$$

where f is a focal length of the imaging lens system, and f1 is a focal length of the first lens.

9. The imaging lens system of claim 1, wherein $$0.10 \text{ mm} < f\text{-}L2IP < 0.30 \text{ mm},$$

where f is a focal length of the imaging lens system, and L2IP is a distance from an object side surface of the second lens to the imaging plane.

10. An imaging lens system, comprising:
a first lens having positive refractive power, a second lens having negative refractive power, a third lens, a fourth lens having positive refractive power, a fifth lens having negative refractive power and a concave object-side surface, a sixth lens, a seventh lens having positive refractive power, and an eighth lens, sequentially arranged from an object side toward an imaging plane, wherein:

$$0.10 < D12/D23 < 0.20, \text{ and}$$

$$0.50 < TTL/2\text{ImgHT} < 0.60,$$

where D12 is a distance from an image side surface of the first lens to an object side surface of the second lens, D23 is a distance from an image side surface of the second lens to an object side surface of the third lens, TTL is a distance from an object side surface of the first lens to an imaging plane, and 2 ImgHT is a diagonal length of the imaging plane.

11. The imaging lens system of claim 10, wherein the seventh lens comprises a convex object side surface.

12. The imaging lens system of claim 10, wherein the eighth lens comprises a concave image side surface.

13. The imaging lens system of claim 10, wherein $$2.60 < T1/T2 < 3.20,$$

where T1 is a thickness of the first lens at a center of an optical axis, and T2 is a thickness of the second lens at the center of the optical axis.

14. The imaging lens system of claim 13, wherein $$1.0 < TTL/f < 1.20,$$

where f is a focal length of the imaging lens system.

15. The imaging lens system of claim 13, wherein $$-3.5 < f2/f < 0,$$

where f is a focal length of the imaging lens system, and f2 is a focal length of the second lens.

\* \* \* \* \*